(12) United States Patent
Naka et al.

(10) Patent No.: US 7,499,930 B2
(45) Date of Patent: Mar. 3, 2009

(54) DATA PROCESSING APPARATUS, DATA PROCESSING METHOD, AND DATA PROCESSING PROGRAM

(75) Inventors: Akiteru Naka, Tokyo (JP); Yojiro Tagawa, Narashino (JP); Katsumi Iijima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 547 days.

(21) Appl. No.: 11/038,160

(22) Filed: Jan. 21, 2005

(65) Prior Publication Data

US 2005/0165857 A1 Jul. 28, 2005

(30) Foreign Application Priority Data

Jan. 28, 2004 (JP) .............................. 2004-020382

(51) Int. Cl.
*G06F 12/00* (2006.01)

(52) U.S. Cl. ..................... 707/101; 707/205; 707/206

(58) Field of Classification Search ................. 707/101
See application file for complete search history.

(56) References Cited

U.S. PATENT DOCUMENTS

| 5,170,479 A | * | 12/1992 | Takamoro ..................... 707/3 |
| 5,608,704 A | | 3/1997 | Kim ............................ 369/56 |
| 5,675,694 A | * | 10/1997 | Nakajima et al. ............. 386/86 |
| 5,774,434 A | * | 6/1998 | Arataki et al. ............. 369/47.13 |
| 5,778,392 A | | 7/1998 | Stockman et al. ........... 707/205 |
| 5,819,290 A | | 10/1998 | Fujita .............................. 707/2 |
| 6,038,636 A | * | 3/2000 | Brown et al. ................. 711/103 |
| 7,054,889 B2 | * | 5/2006 | Todo et al. ................... 707/200 |
| 2002/0054383 A1 | * | 5/2002 | Sato et al. ..................... 358/504 |
| 2002/0129200 A1 | | 9/2002 | Arakawa et al. ............. 711/112 |
| 2002/0164147 A1 | | 11/2002 | Suda ............................ 386/46 |
| 2003/0081938 A1 | * | 5/2003 | Nishimura et al. ............ 386/52 |
| 2005/0074063 A1 | * | 4/2005 | Nair et al. ............... 375/240.11 |
| 2007/0055688 A1 | * | 3/2007 | Blattner ...................... 707/102 |

FOREIGN PATENT DOCUMENTS

| CN | 1123448 | 5/1996 |
| EP | 0 833 339 A2 | 4/1998 |
| EP | 0 903 742 A2 | 3/1999 |
| JP | 2003-052006 A | 2/2003 |

OTHER PUBLICATIONS

Chinese Official Communication, dated Jul. 20, 2007, regarding Chinese Patent Application No. 2005100048016.

* cited by examiner

*Primary Examiner*—Don Wong
*Assistant Examiner*—Binh V Ho
(74) *Attorney, Agent, or Firm*—Fitzpatrick, Cella, Harper & Scinto

(57) ABSTRACT

This invention provides a technique that deletes data at high speed, and prevents discontinuous cluster chains from being produced due to data deletion. To accomplish this, when data included in the data file is partially deleted from the head of the data file, the location of header information is moved for respective clusters, and the size of the header information is changed, so as to start head data after data deletion from the location immediately after the moved header information.

16 Claims, 21 Drawing Sheets

F I G. 1
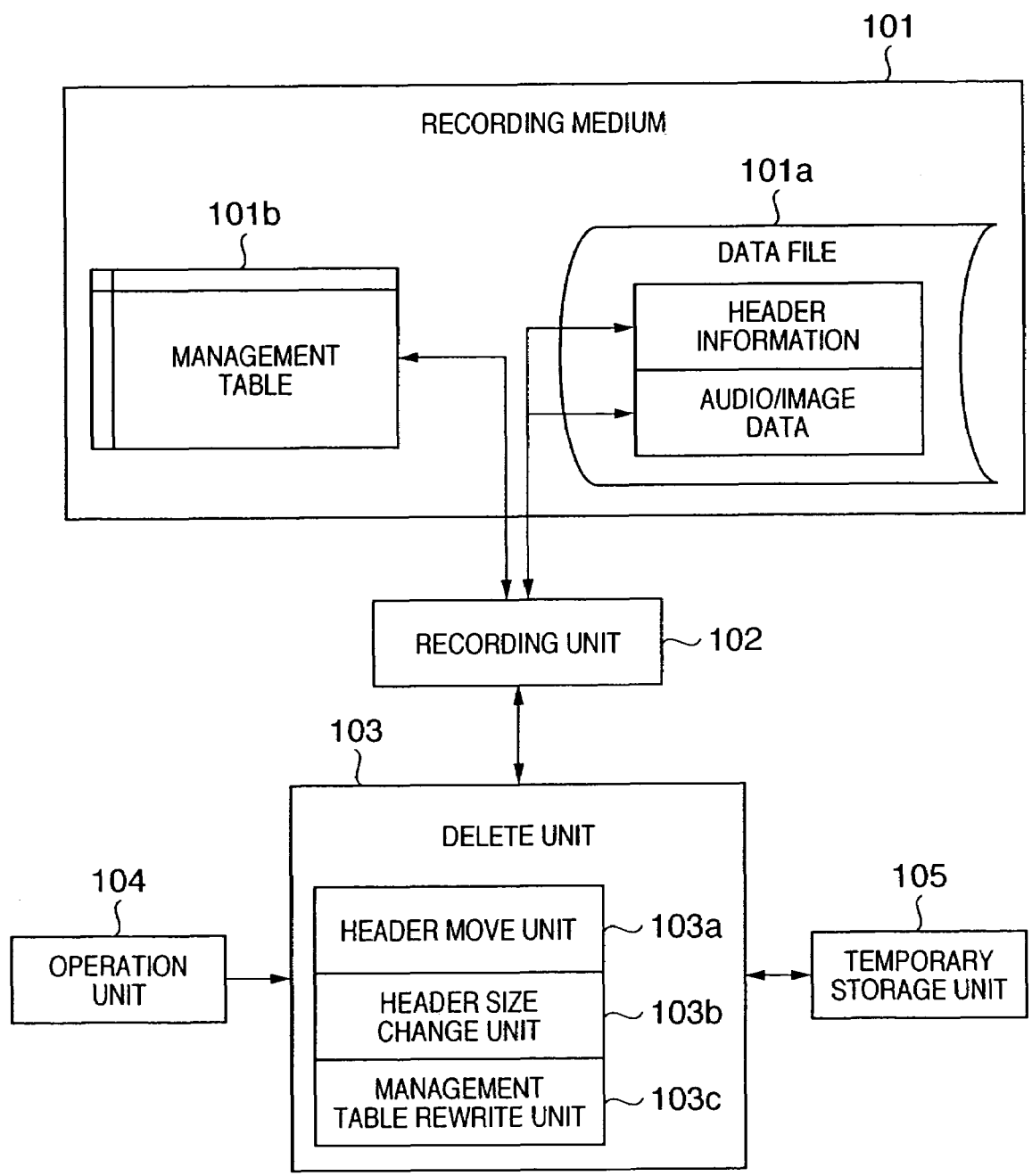

FIG. 6

| CLUSTER NUMBER | VALUE |
|---|---|
| 0 | FFF8h |
| 1 | FFFFh |
| 2 | 0003h |
| 3 | 0004h |
| 4 | 0005h |
| 5 | 0006h |
| 6 | FFFFh |
| 7 | 0000h |
| 124 | 0000h |
| 125 | 0000h |
| 126 | 0000h |
| 127 | 0000h |

Rows 0–1: 351
Rows 2–127: 352

DATA PROCESSING APPARATUS, DATA PROCESSING METHOD, AND DATA PROCESSING PROGRAM

FIELD OF THE INVENTION

The present invention relates to a data processing technique that partially deletes data included in a data file.

BACKGROUND OF THE INVENTION

Conventionally, a data processing technique that partially deletes data included in a data file is well known. Especially, when a data file recorded on a recording medium is to be partially deleted for respective clusters, various methods are used to effectively use a delete area.

A conventional data delete process will be described below using FIG. 2. Reference numerals 201 to 206 in FIG. 2 denote a data file which is to undergo a partial delete process. A file offset is moved to valid data immediately after a delete area to read a data file, and data is acquired on a memory (201→202). The file offset is moved to the head of the delete area to write the acquired data on the delete area (203). The read and write processes are repeated up to the end of the file (204, 205). Finally, the file size of the data file is set by excluding the area to be deleted (206). When the data file is to be partially deleted, as described above, the edit operation is implemented by repeating a plurality of read and write processes. However, with the conventional edit method, since read and write accesses to the recording medium are repeated to move data upon partially deleting a file, a high-speed edit operation cannot be provided to the user.

To solve this problem, an information edit control apparatus of Japanese Patent Laid-Open No. 2003-52006 discloses a method of reducing the number of read and write accesses to a recording medium by a method to be described below for partial data deletion.

FIG. 3 shows audio/visual (AV) data which is recorded on a recording medium and is configured for respective frames. Upon deleting a gray part of AV data 311, clusters including only frames to be partially deleted are deleted on the file system (312). For one cluster which includes both an unnecessary area as a data area to be deleted, and a valid area as a data area which is not to be deleted, dummy data is inserted in the unnecessary area (313). The aforementioned method implements partial deletion without making read and write accesses. Furthermore, when dummy data for one cluster or more is inserted in clusters that neighbor AV data (314), data of a valid area is moved (315). Finally, if a cluster including only an unnecessary area is present, it is set as an unused area on the file system to delete it (316). With the aforementioned processes in two steps, the number of read and write accesses to a recording medium is reduced, unnecessary dummy data is deleted, and a high-speed edit operation is provided to the user.

However, although the aforementioned method can reduce the number of read and write accesses, free clusters are discontinuously generated due to a change in cluster chain, and a long seek time is required for a data file that has undergone the edit operation. Also, since fragmentation occurs, a long time is required to seek a free cluster area from the recording medium.

SUMMARY OF THE INVENTION

The present invention has been made to solve the conventional problems, and provides a data processing technique which implements high-speed data deletion, and can prevent a discontinuous cluster chain from being produced by data deletion.

A data processing apparatus according to the present invention comprising recording means for recording a data file for respective clusters on a recording medium, and data deletion means for partially deleting data included in the data file from a head of the data file, wherein when the data deletion means partially deletes data included in the data file from the head of the data file, the data deletion means moves a location of header information for respective clusters, and changes a size of the header information, so as to start head data after data deletion from a location immediately after the moved header information.

Other features and advantages of the present invention will be apparent from the following description taken in conjunction with the accompanying drawings, in which like reference characters designate the same or similar parts throughout the figures there.

BRIEF DESCRIPTION OF THE DRAWINGS

FIG. 1 is a block diagram showing the functional arrangement that implements a data delete process according to the present invention;

FIG. 6 is an image view showing the FAT;

DETAILED DESCRIPTION OF THE PREFERRED EMBODIMENTS

A preferred embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

In recent years, many users record moving image data on recording media such as a CF card and the like in the Audio Visual Interleaving file (to be referred to as AVI file hereinafter) format using digital still cameras or digital video cameras, and enjoy instant playback of recorded data. It is demanded to directly perform an edit operation for immediately deleting an unnecessary part by digital still cameras or digital video cameras when the user plays back an AVI file immediately after photographing, and finds an unnecessary part. Hence, a digital still camera which has an image sensing function and data delete function in the AVI file format as an embodiment of the present invention will be explained hereinafter.

<Hardware Arrangement>

Figure 2:
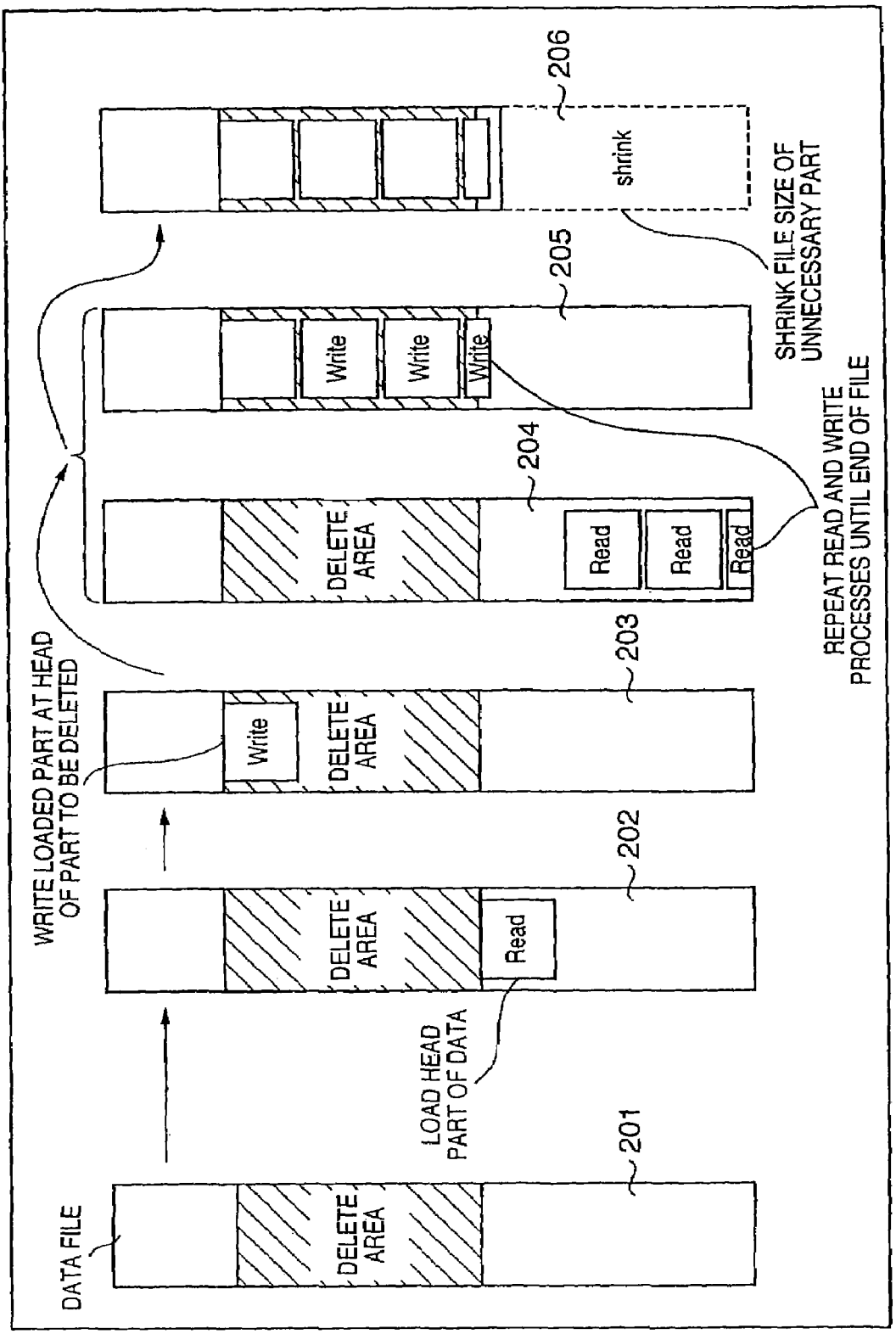
FIG. 2 is an image view upon executing an edit operation of an AVI file.
Figure 3:
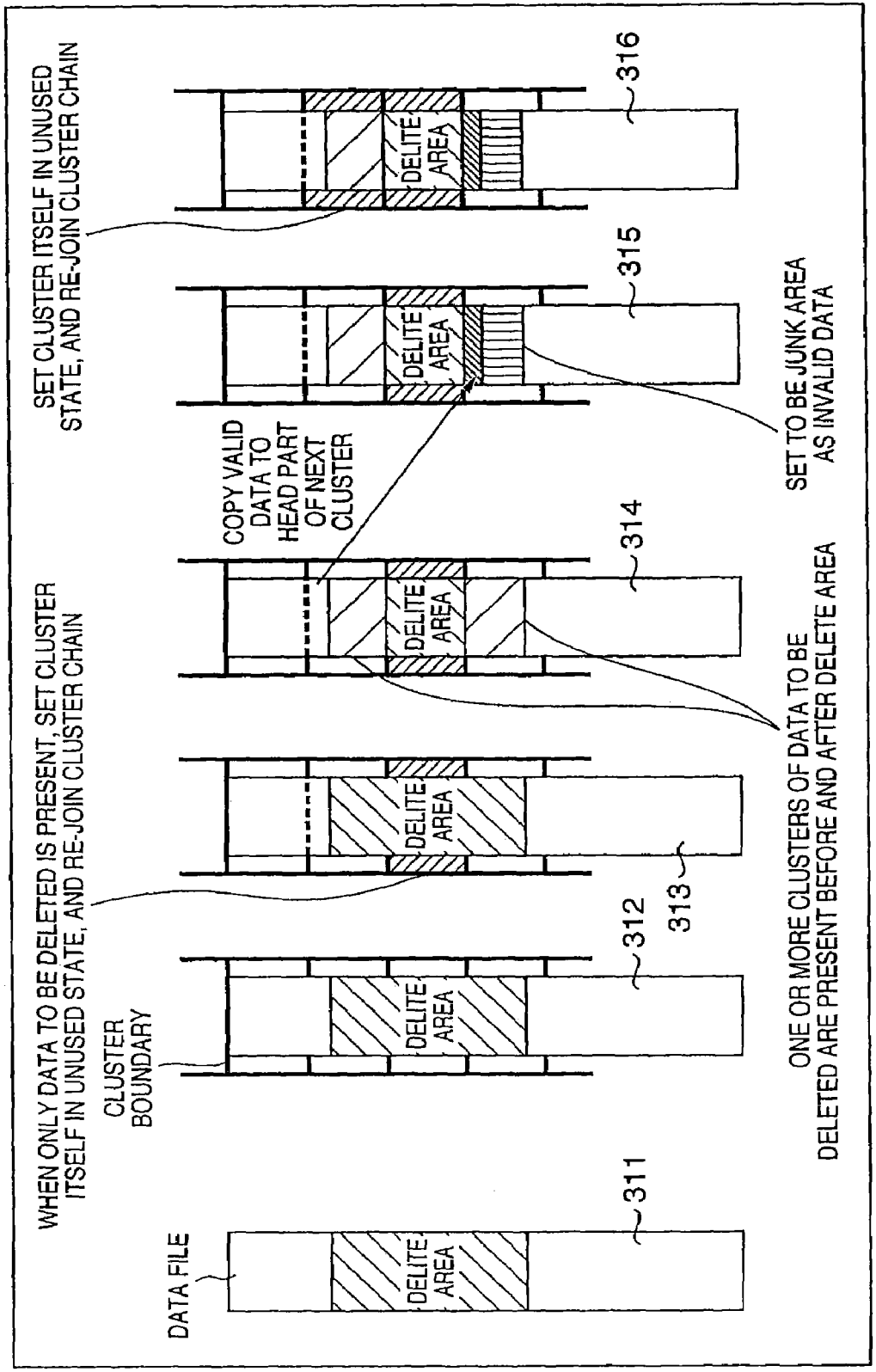
FIG. 3 is an image view upon executing an edit operation of an AVI file using a FAT.
Figure 4:
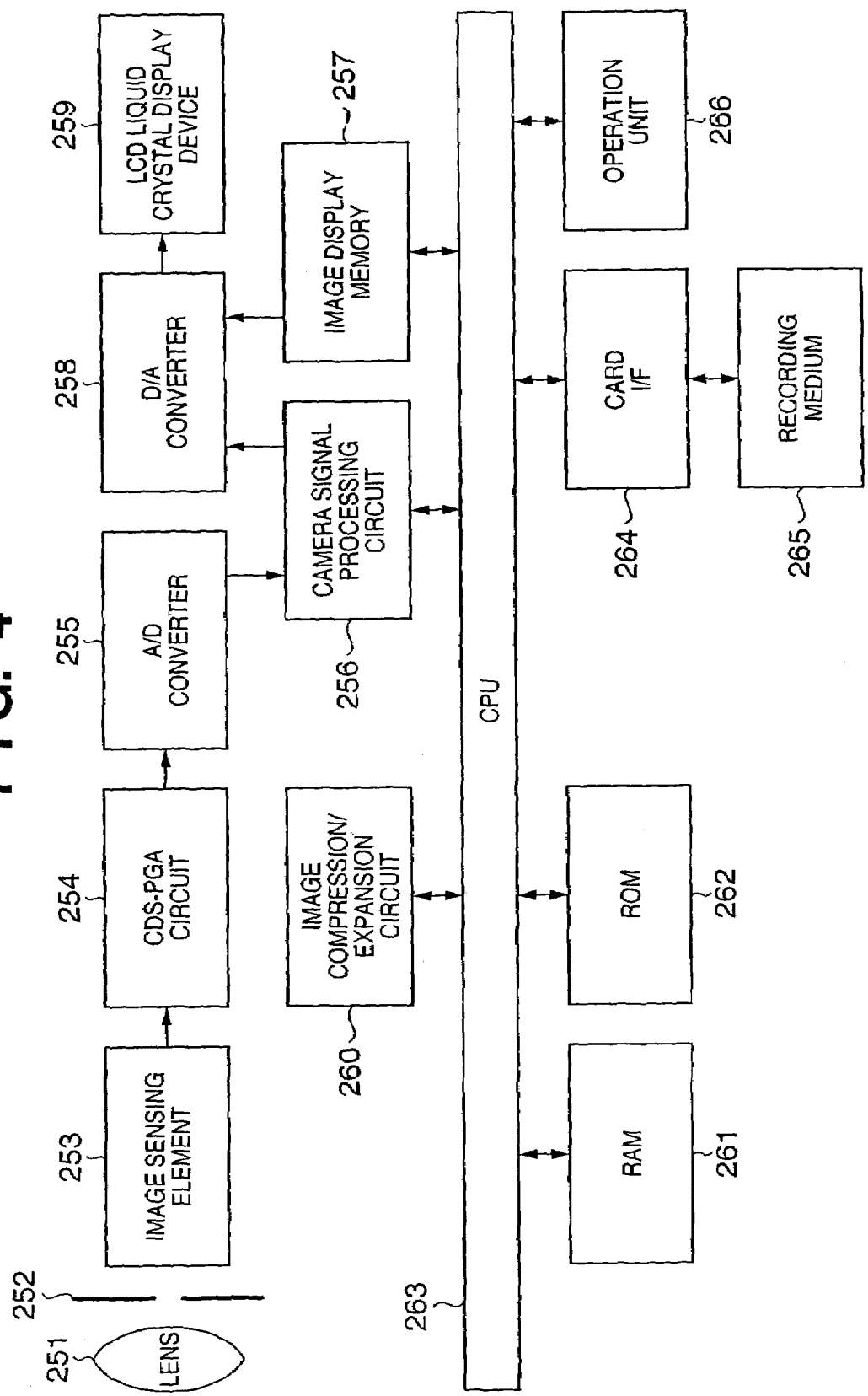
FIG. 4 is a block diagram showing the overall arrangement of a system according to an embodiment of the present invention.

FIG. 4 is a block diagram showing the hardware arrangement of a digital still camera according to an embodiment of the present invention. Referring to FIG. 4, reference numeral 251 denotes a lens which forms an object image (not shown); 252, a stop mechanism which adjusts the amount of light coming from the lens 251; 253, an image sensing element which converts an optical signal which is input from the lens 251 via the stop mechanism 252 into an electrical signal; 254, a CDS-PGA circuit which samples the signal photoelectrically converted by the image sensing element 253 and applies gain control; 255, an analog-to-digital converter (to be referred to as A/D converter hereinafter) which converts an analog signal output from the CDS-PGA circuit 254 into a digital signal; 256, a camera signal processing circuit which applies a predetermined process to the signal A/D-converted by the A/D converter 255; 257, an image display memory which temporarily holds a video signal so as to display an image; 258, a digital-to-analog converter (to be referred to as D/A converter hereinafter) which converts the digital signal output to the image display memory into an analog signal; 259, an LCD liquid crystal display device which displays an analog video signal output from the D/A converter 258 to the user; 260, an image compression/expansion circuit which compresses image data output from the camera signal processing circuit 256 using a compression algorithm such as JPEG or the like, and expands compressed data; 261, a memory area (to be referred to as RAM hereinafter) which temporarily stores data output from the camera signal processing circuit 256, an AVI file read out from a recording medium upon file edit, and the like; 262, a memory area (to be referred to as ROM hereinafter) which stores programs (including a data edit program) and data required to control the digital still camera; 263, a microcomputer (to be referred to as CPU hereinafter) which controls the overall digital still camera by executing programs stored in the RAM 261 and ROM 262; 264, a recording medium such as a memory card, disk, or the like which saves image data temporarily stored on the RAM 261 in the form of an image file; and 265, a card interface (to be referred to as card I/F hereinafter) which is required to read and write image data from and onto the recording medium 264. Reference numeral 266 denotes an operation unit which receives a data edit instruction and various setting instructions from the user. The operation unit 266 includes a cross-cursor button and the like, and can be used to determine a portion to be deleted of a file.

<Configuration of Recording Medium>

Figure 5:
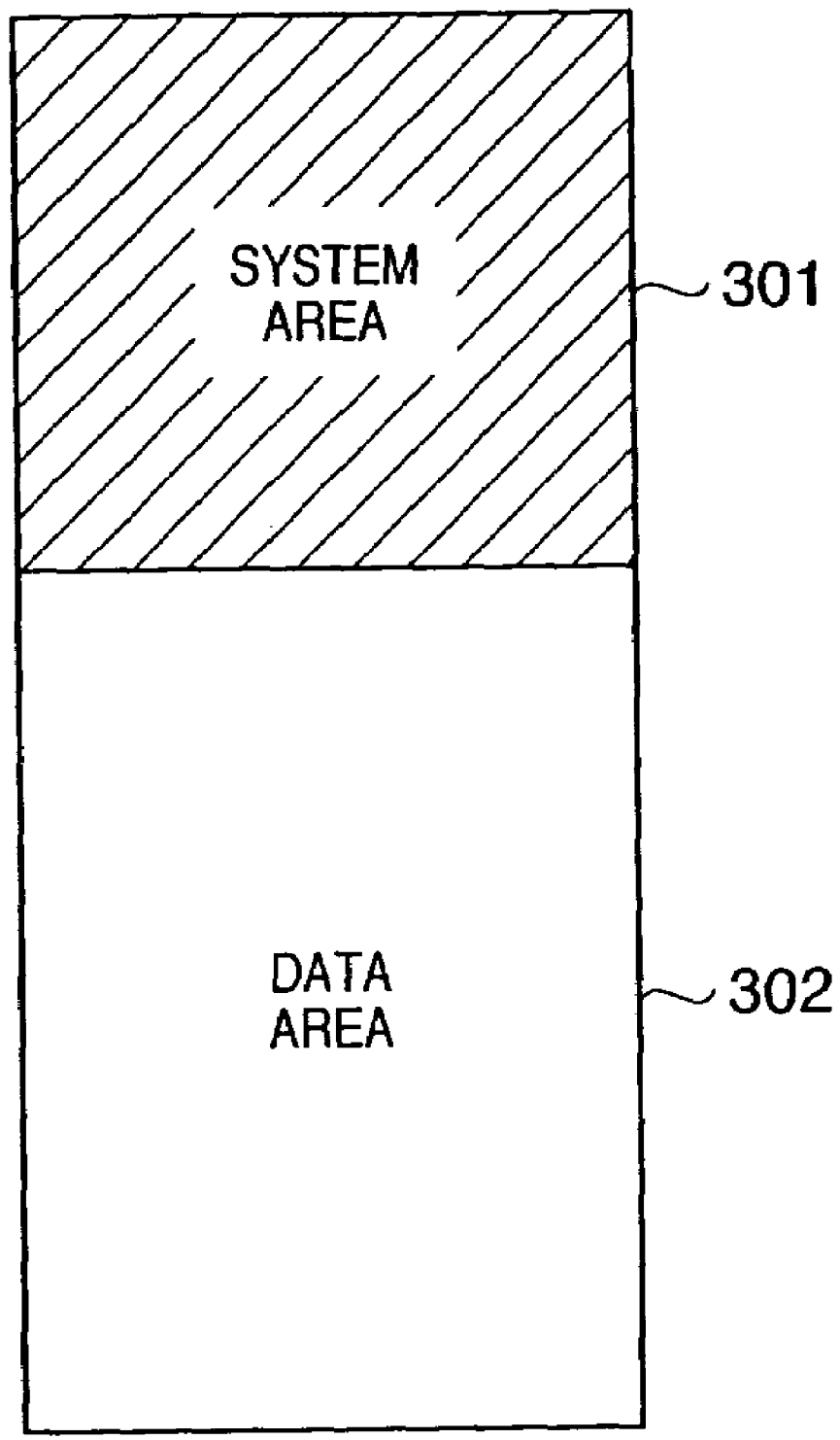
FIG. 5 is an image view showing a FAT file system.

FIG. 5 is an image view when the recording medium 265 shown in FIG. 4 is formatted by the FAT (File Allocation Table) format. A recording area includes a system area 301 and data area 302. The system area 301 includes three areas: (1) a boot sector area which is used to designate a program for loading an OS itself and to define the structure of the system and data areas, (2) a FAT area which stores the state (recording order) of clusters included in the data area, and (3) a root directory area which manages files and subdirectory information at a root directory of the recording medium.

The data area 302 divisionally records information of data entities of files and subdirectories in units of called clusters. The clusters are managed by cluster numbers. A cluster number "2" is assigned to the first cluster on the recording medium, and the subsequent numbers are assigned in ascending order.

FIG. 6 is an image view showing the FAT area. Respective items of the FAT start from zero, and are associated to have one-to-one correspondence with the clusters in the data area. Reference numeral 351 denotes the first two items (clusters with numbers 0 and 1) of the FAT area, which are used for special purposes such as a format identifier and the like. Reference numeral 352 denotes values indicating the states of 2nd to n-th clusters. With these values, whether each cluster in the data area is already assigned (in use), "free", or "defective" can be identified. If that cluster is free, "0" or "1" is described. If that cluster is in use, a value indicating the cluster number of the next cluster or a value indicating the end of a file is described. That is, if the value assigned to a FAT entry ranges from 2 to FFEFh, a cluster corresponding to that FAT entry is in use, and its value indicates the number of the next cluster. If the value assigned to a FAT entry is FFF7h, it indicates a defective cluster. If the value assigned to a FAT entry ranges from FFF8h to FFFFh, it indicates that a cluster corresponding to that FAT entry is in use, and is the last one of a file. In this manner, a file that extends across clusters can be accessed.

Figure 7:
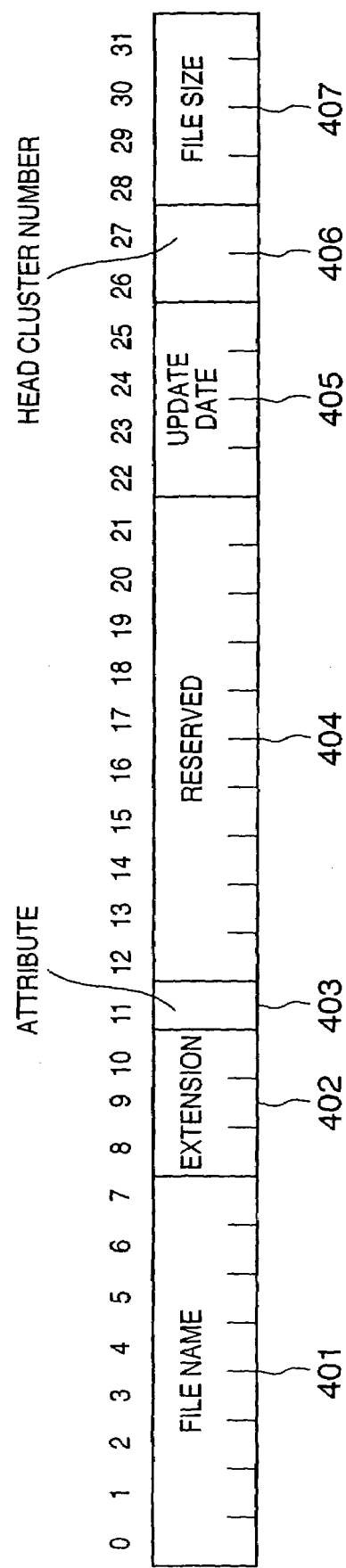
FIG. 7 is an image view showing a directory entry.

FIG. 7 is an image view showing a directory entry. Reference numeral 401 denotes a field which records a character string of a name used for a file or directory except for an extension. Reference numeral 402 denotes a field which records a character string as an extension of a file. Reference numeral 403 denotes a field which records attribute information of a file or directory. Reference numeral 404 denotes a reserved field. Reference numeral 405 denotes a field which records a time upon creating and updating a file or directory. When this field follows a head cluster, data can be acquired up to the end of a file by tracing FAT entries. Reference numeral 406 denotes a field which records a head cluster number where a file, directory, or the like is present. Reference numeral 407 denotes a field which records a file size using a byte size.

<File Configuration>

An AVI file is configured using an RIFF (Resource Interchange File Format) format. The RIFF format is a file format used to combine various resources into one file, and is characterized in that even when a new format is added, the basic structure can be maintained without changing the overall structure. The RIFF file format is formed using a block called a chunk as one unit. All chunks are categorized into RIFF chunks, LIST chunks, or subchunks, and RIFF chunks and LIST chunks can recursively have LIST chucks or subchunks in their data fields.

Figure 8:
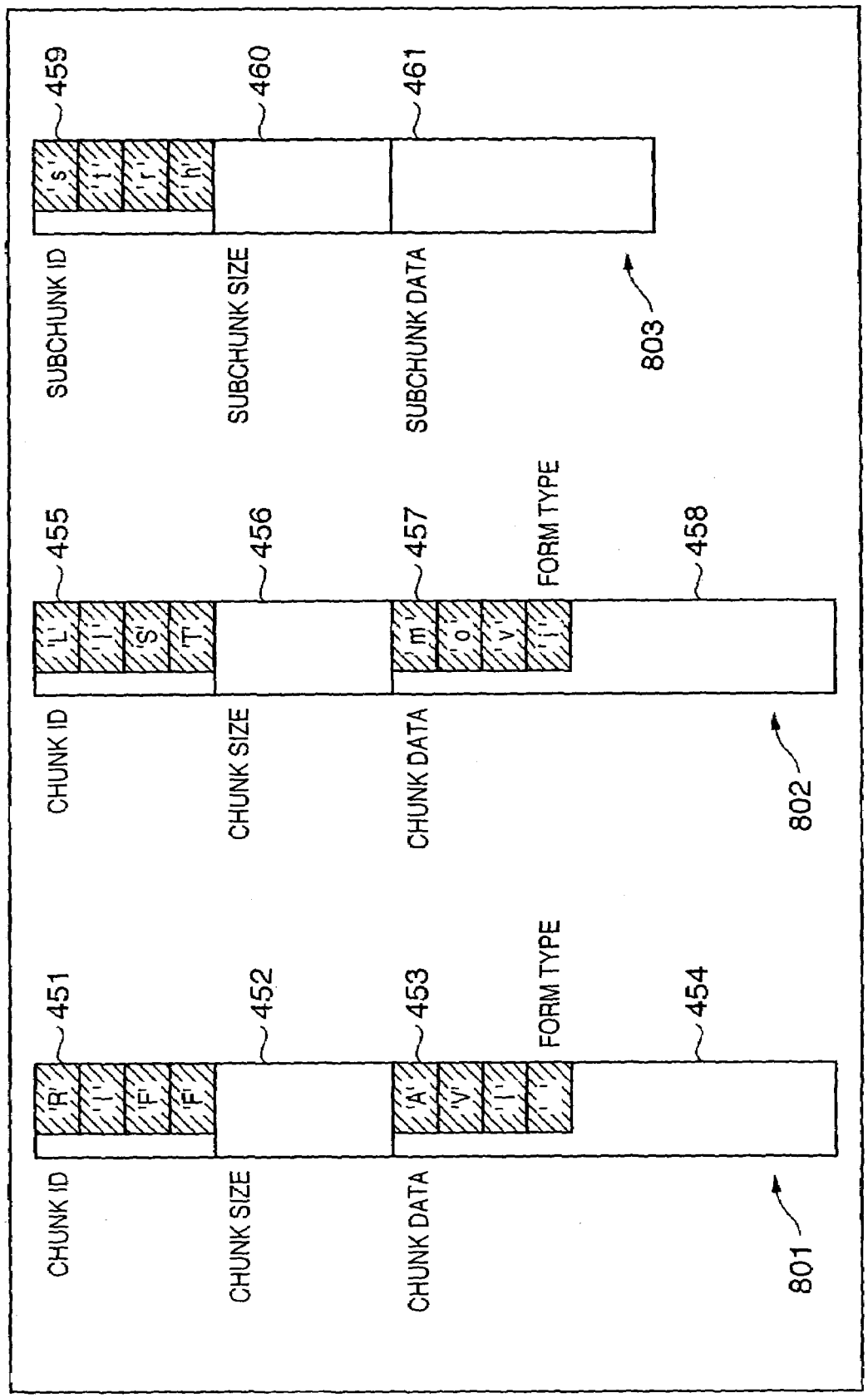
FIG. 8 is an image view showing chunks of an AVI file in the RIFF format.

FIG. 8 shows the configuration of an AVI file. Reference numeral 801 denotes an RIFF chunk. In the RIFF chunk 801, reference numeral 451 denotes a chunk ID used to identify the chunk type. In case of the RIFF chunk, a character string "RIFF" is set in the first four bytes. The first chunk of the AVI file must be an RIFF chunk. Reference numeral 454 denotes chunk data as a data part of the RIFF chunk. Reference numeral 452 denotes a chunk size which indicates the byte length of the RIFF chunk data 454. Reference numeral 453 denotes a form type which is described in the first four bytes of the chunk data 454. In case of the AVI file, a character string "AVI" is described.

Reference numeral 802 denotes a LIST chunk. In the LIST chunk 802, reference numeral 455 denotes a chunk ID used to identify the chunk type. In case of the LIST chunk, a character string "LIST" is set in the first four bytes. Reference numeral 458 denotes chunk data as a data part of the LIST chunk. Reference numeral 456 denotes a chunk size which indicates the byte length of the chunk data 458. Reference numeral 457 denotes a form type which is described in the first four bytes of the chunk data 456. The meaning of the LIST chunk is defined depending on a character string described in this field.

Reference numeral 803 denotes a subchunk. In the subchunk 803, reference numeral 459 denotes a subchunk ID used to identify the subchunk type. Reference numeral 461 denotes subchunk data as a data part of the subchunk. Reference numeral 460 denotes a subchunk size indicating the byte length of the subchunk data 461.

Figure 9:
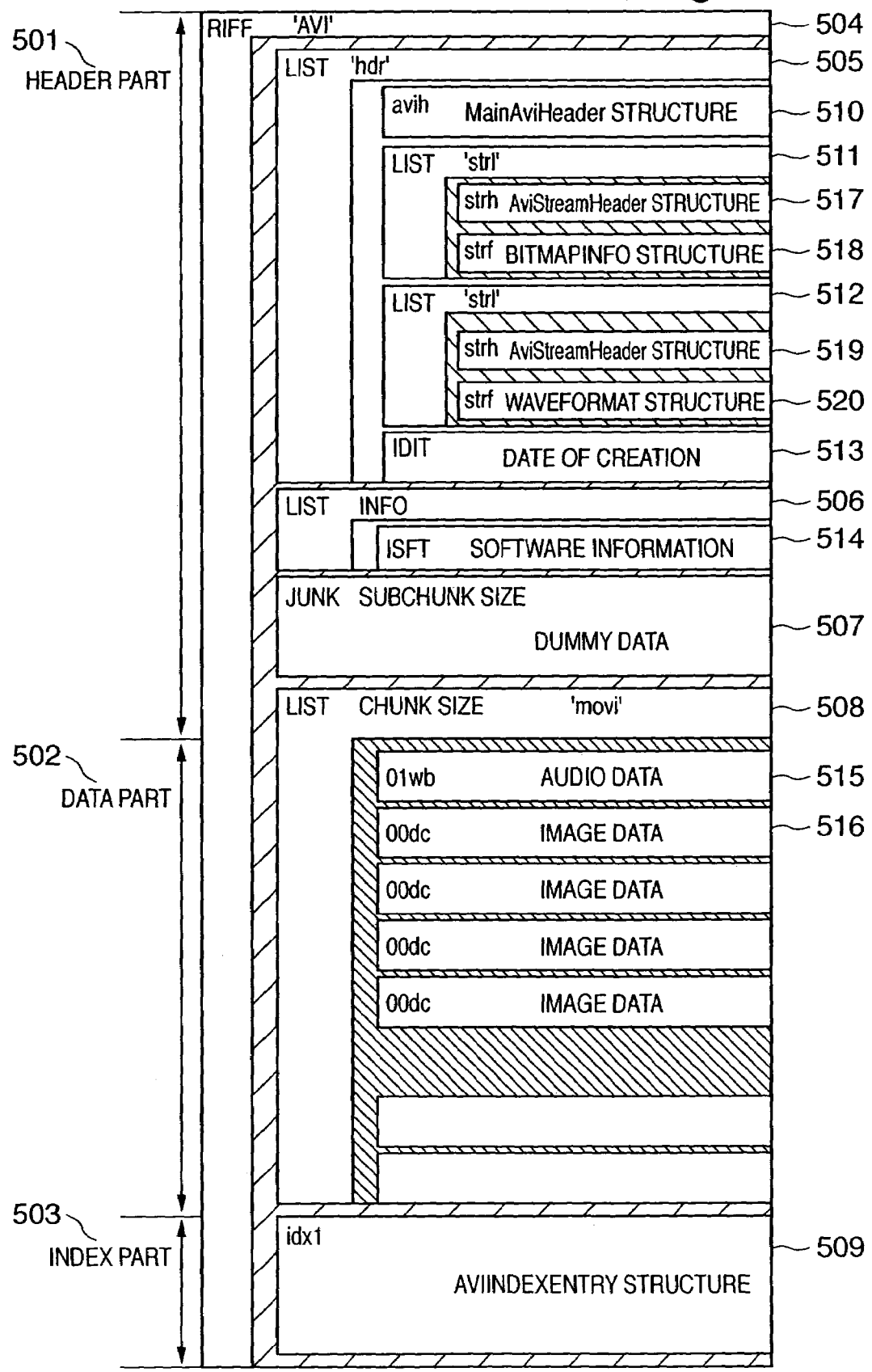
FIG. 9 is an image view showing an example of an AVI file in the RIFF format.

FIG. 9 is an image view of the AVI file in the RIFF format. Reference numeral 501 denotes a header part as a data field which stores header information associated with photographing information of the AVI file. Reference numeral 502 denotes a data field associated with actual audio and image data of the AVI file. Reference numeral 503 denotes a data field used to cache an offset value of audio or image data recorded in the field 502 on the AVI file or the byte size of the audio or image data.

Referring to FIG. 9, reference numeral 504 denotes an RIFF chunk with a form type 'AVI'. The chunk data field of the RIFF chunk includes a LIST chunk 505 with a form type 'hdrl', a LIST chunk 506 with a form type 'INFO', a subchunk 507 with a subchunk ID 'JUNK' having dummy data in its subchunk data field, a LIST chunk 508 with a form type 'movi', and a subchunk 509 with a subchunk ID 'idx1'.

The LIST chunk 505 includes a subchunk 510 with a subchunk ID 'avih', a LIST chunk 511 with a form type 'strl', a LIST chunk 512 with a form type 'strl', and a subchunk 513 with a subchunk ID 'IDIT' having creation date data in its subchunk data field.

The LIST chunk 506 includes a subchunk 514 with a subchunk ID 'ISFT' which has software information in its subchunk data field.

The JUNK subchunk 507 has dummy data in its subchunk data field. By changing the size of this dummy data, the size of the header field can be changed.

The LIST chunk 508 includes a subchunk 515 with a subchunk ID '01wb' having audio data in its subchunk data field, and a subchunk 516 with a subchunk ID '00dc' having a plurality of image data in its subchunk data field. The subchunks 515 having audio data and subchunks 516 having image data repetitively appear in correspondence with the number of recorded frames.

Subchunk data in the subchunk 509 is formed of an AVI-INDEXENTRY structure.

The LIST chunk 511 includes a subchunk 517 with a subchunk ID 'strh' having an AviStreamHeader structure in its subchunk data field, and a subchunk 518 with a subchunk ID 'strf' having a BITMAPINFO structure in its subchunk data field. The LIST chunk 512 includes a subchunk 519 with a subchunk ID 'strh' having an AviStreamHeader structure in its subchunk data field, and a subchunk 520 with a subchunk ID 'strf' having a WAVEFORMAT structure in its subchunk data field.

By loading and playing back in turn audio and image data of subchunks included in chunk data of the LIST chunk 508 in FIG. 9, moving image playback is implemented. In FIG. 9, the subchunk 515 including audio data corresponds to audio data which is loaded first upon playing back the AVI file. The subchunk 516 including image data in FIG. 9 corresponds to image data which is loaded first upon playing back the AVI file.

Figure 10:
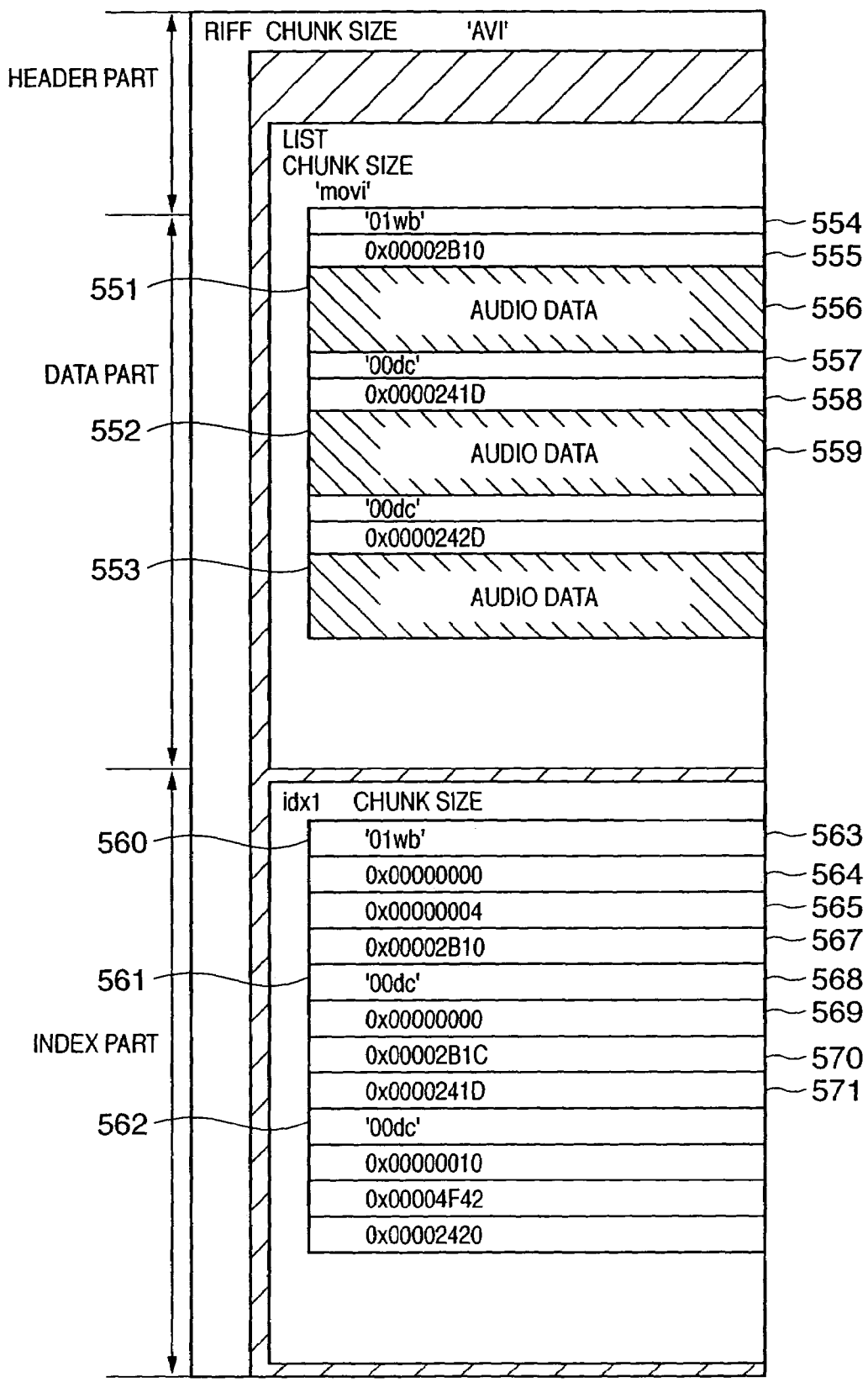
FIG. 10 is an image view showing details of an example of an AVI file.

FIG. 10 is an image view showing details of the LIST chunk 508 and subchunk 509 in FIG. 9. Reference numeral 551 denotes a subchunk having image data as subchunk data. Reference numeral 552 denotes a subchunk having image data as subchunk data. Likewise, reference numeral 553 denotes a subchunk having image data as subchunk data after the subchunk 552. Reference numeral 554 denotes a subchunk ID of the subchunk 551. Reference numeral 555 denotes a byte length of the subchunk data of the subchunk 551. Reference numeral 556 denotes subchunk data. Likewise, reference numeral 557 denotes a subchunk ID of the subchunk 552. Reference numeral 558 denotes a byte length of the subchunk data of the subchunk 552. Reference numeral 559 denotes subchunk data of the subchunk 552.

The subchunk data indicated as the subchunk 509 in FIG. 9 includes an AVIINDEXENTRY structure, and reference numeral 560 denotes its first entry. Likewise, reference numeral 561 denotes a second entry; and 562, a third entry. The subchunks 551, 552, and 553 of the LIST chunk have one-to-one correspondence with the entries 560, 561, and 562. Each entry of the AVIINDEXENTRY structure includes an ID, flag, offset from the head of chunk data in the LIST chunk, and subchunk data size, holds various kinds of information of the subchunk 551, 552, or 553, and is used upon playing back an AVI file.

Reference numeral 554 denotes a subchunk ID of the subchunk 551; and 555, a byte length of chunk data of the subchunk 551. The entry 560 corresponding to the subchunk 551 holds an ID 563 '01wb' which is the same as the subchunk ID 554, and holds a flag 564 '0x00000000' indicating audio data. Furthermore, the entry 560 holds an offset 565 of the subchunk 551 from the head of the chunk data of the LIST chunk, and a byte length 567 of the subchunk 551. Likewise, the entry 561 corresponding to the subchunk 552 holds an ID 568 '00dc' which is the same as the subchunk ID 557, and a flag 569 '0x00000010' indicating image data. Furthermore, the entry 561 holds an offset 570 of the subchunk 552 from the head of the chunk data of the LIST chunk, and a byte length 571 of the subchunk 552. By utilizing the respective entries such as the entries 560, 561, and the like of the AVIINDEXENTRY structure upon playing back an AVI file, smooth accesses to audio and image data in the LIST chunk can be provided.

<Partial Delete Process>

Figure 11:
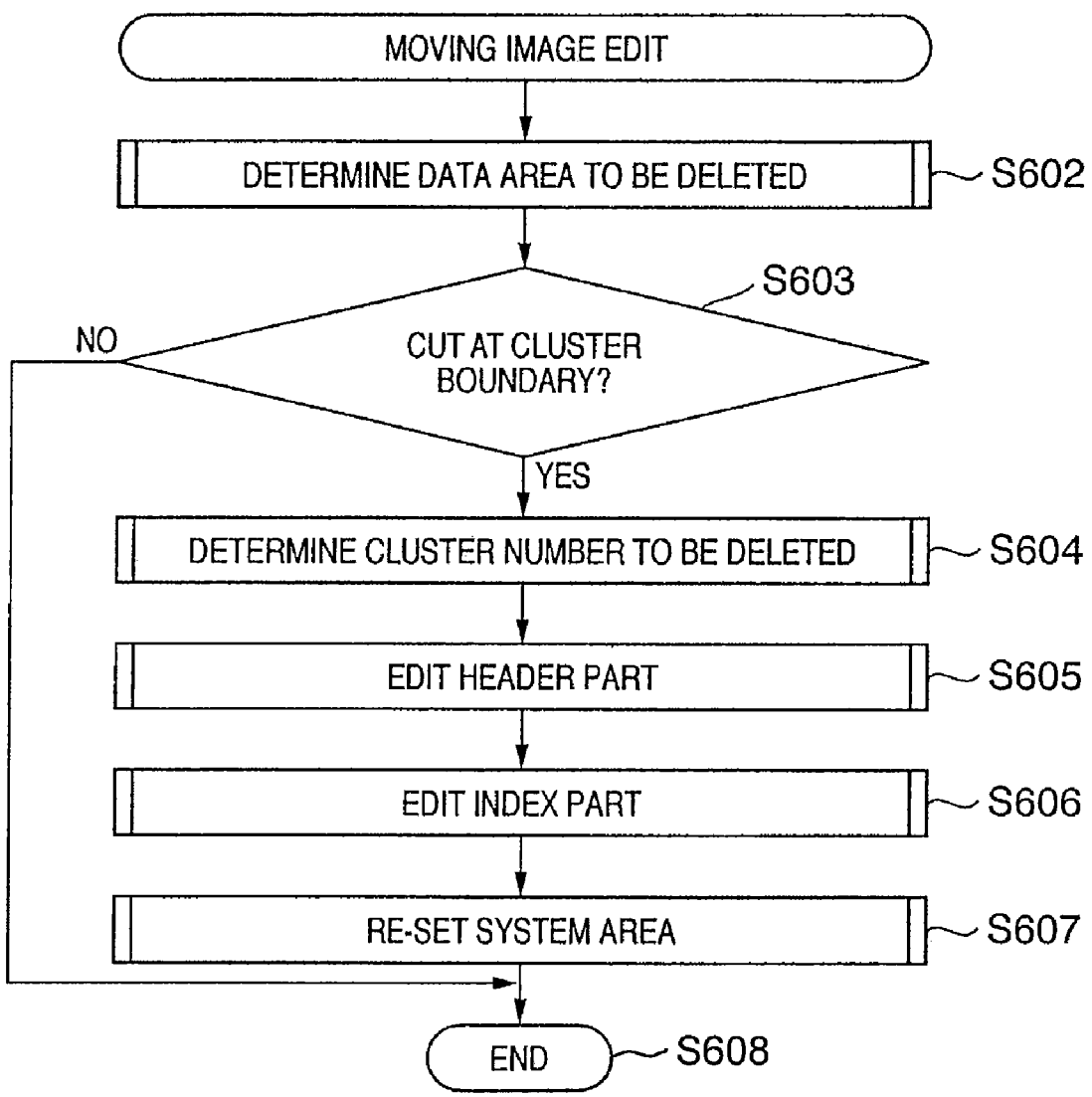
FIG. 11 is a flowchart showing the overall data delete process.

FIG. 11 is a flowchart roughly showing the flow of the partial delete process of an AVI file. The process shown in this flowchart is implemented when the CPU 263 executes a file delete program stored in the ROM 262.

In step S602, a process for determining an area to be deleted from the head of the AVI file is executed. After execution of partial deletion from the head of the AVI file, the flow advances to step S603 to check if a cluster chain can be cut at the cluster boundary. If the cluster chain cannot be cut at the cluster boundary, the flow jumps to step S608 to end this sequence. If the cluster chain can be cut at the cluster boundary in step S603, the flow advances to step S604. In step S604, a process for selecting clusters to be deleted in practice is executed, and the flow advances to step S605. In step S605, an edit process of a header part of the AVI file is executed to perform an operation for copying the header part to the head cluster of the AVI file after partial deletion. The flow then advances to step S606. In step S606, an edit process of an index part is executed to correct a file offset after partial deletion. In step S607, a process for re-setting a system area that manages a cluster area of the FAT file system, describing the cluster number of a new head cluster of the AVI file in the directory entry, and so forth is executed. Upon completion of re-setting of the system area in step S607, the moving image edit process ends, thus ending this sequence.

Figure 12:
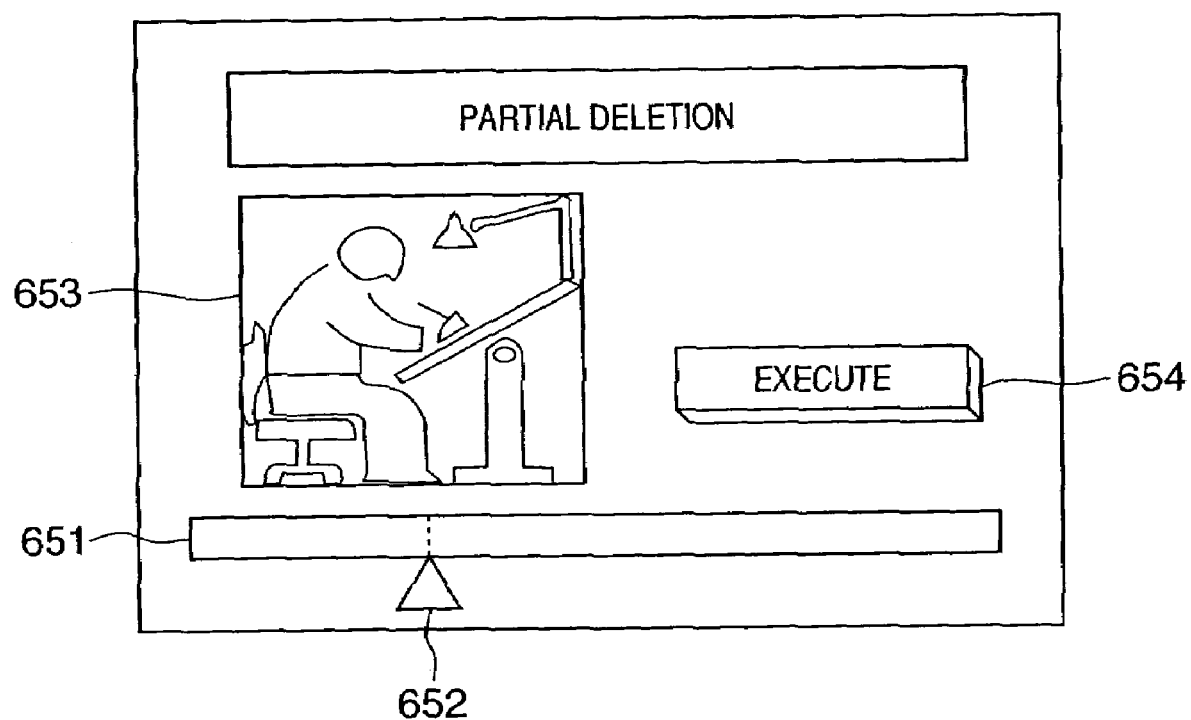
FIG. 12 is an image view of a UI window used to delete a head part of a data part of an AVI file.

FIG. 12 is an image view of an UI window used to perform head part deletion of a data part of an AVI file. Reference numeral 651 denotes an indicator indicating the total data size of the AVI file. Reference numeral 652 denotes a delete mark indicating a position to be deleted from the head in all data of the AVI file. Reference numeral 653 denotes image data of the head frame of the AVI file after deletion. Reference numeral 654 denotes a button as a means for determining head part deletion.

Figure 13:
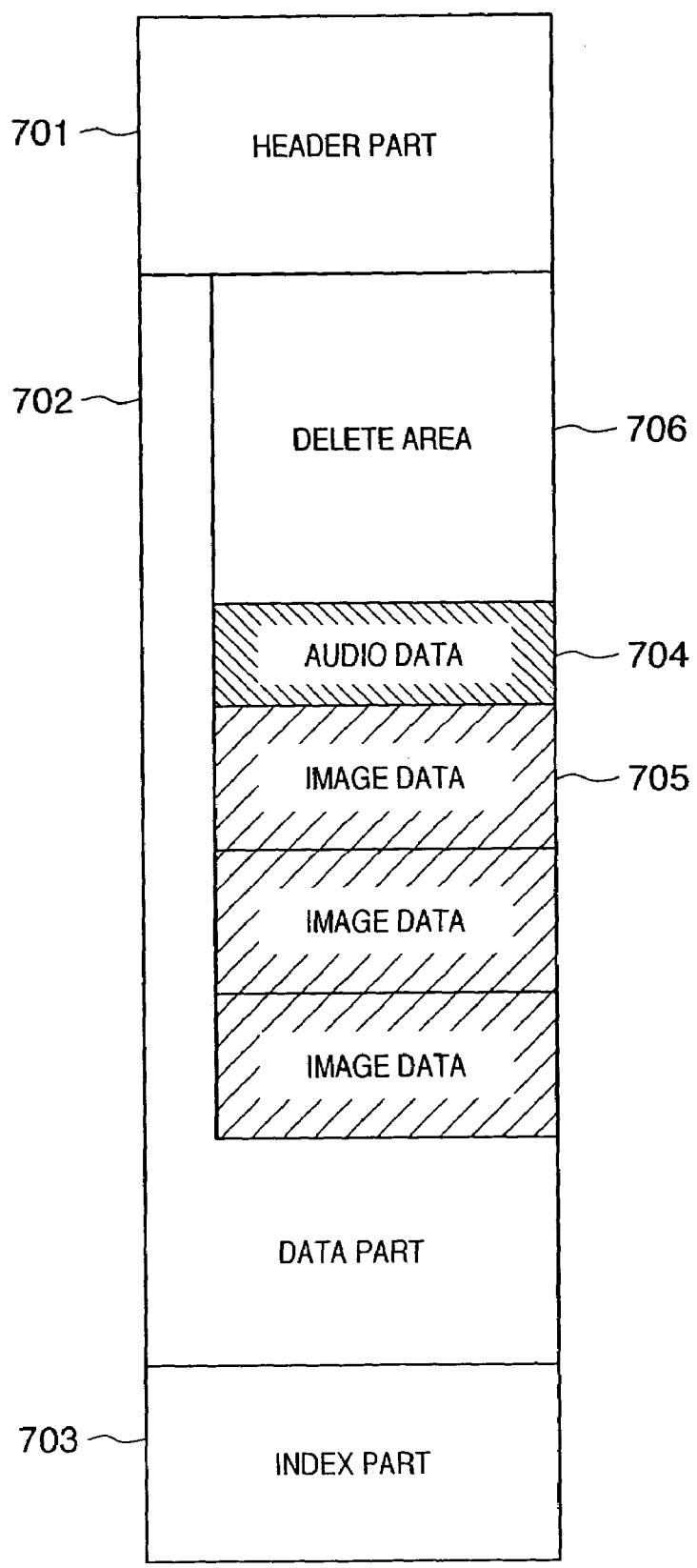
FIG. 13 is an image view of an AVI file which is to undergo a head part delete process.

FIG. 13 is an image view of an AVI file which is to undergo head part deletion in FIG. 12. Reference numeral 701 denotes a header part which describes various parameters of moving image data such as a frame rate and the like of the AVI file. Reference numeral 702 denotes a data part where subchunks including audio and image data of the AVI file are allocated. Reference numeral 703 denotes an index part that describes the byte sizes of audio and image data, and the offset values and the like in the AVI file. Reference numeral 704 denotes a subchunk which becomes head audio data of the AVI file after deletion. Reference numeral 705 denotes a subchunk which becomes head image data of the AVI file after deletion. This subchunk is displayed on the image display area 653 in FIG. 12. Reference numeral 706 denotes subchunks to be deleted from the AVI file if head part deletion is made.

Figure 14:
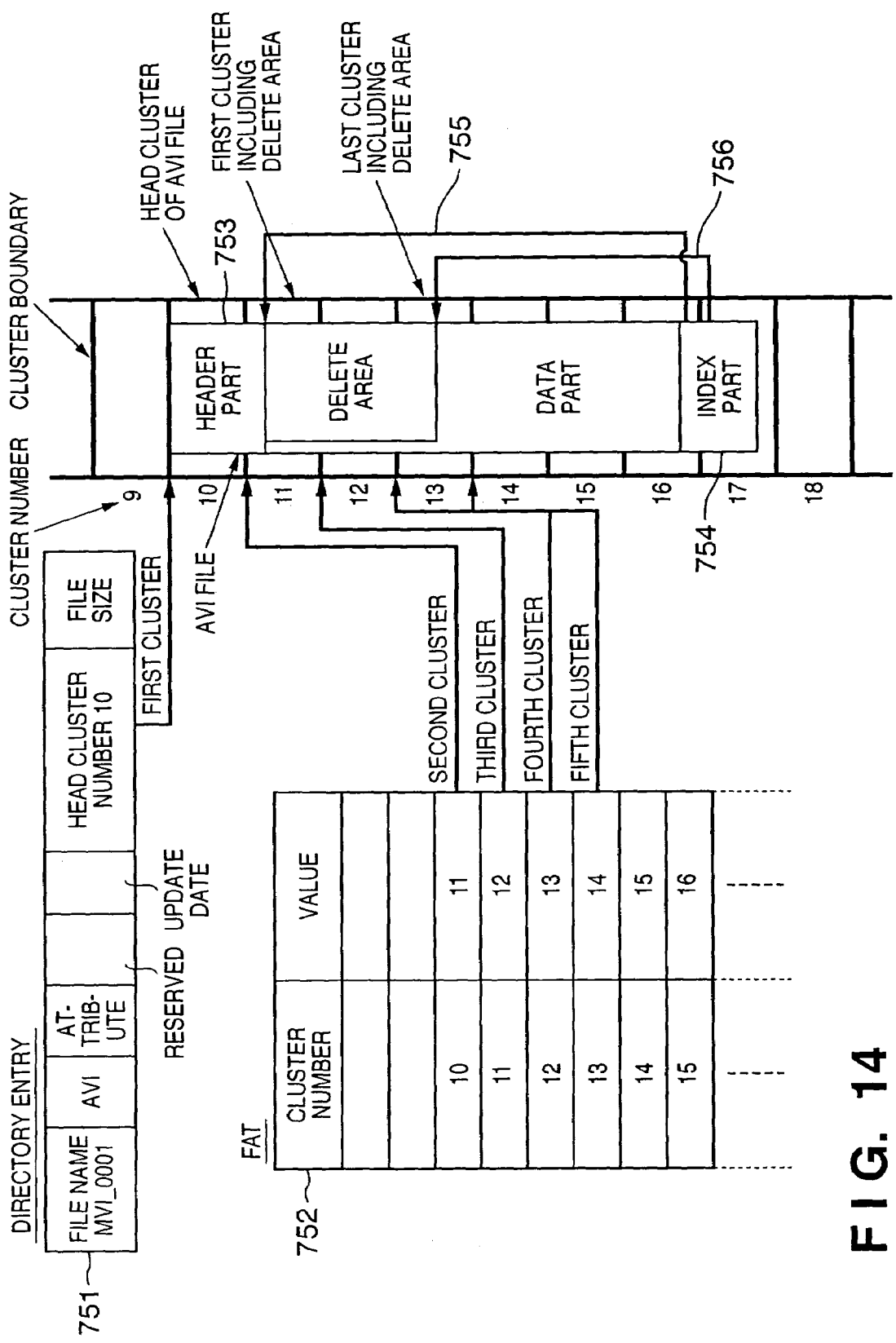
FIG. 14 is an image view of a file system including an AVI file.

FIG. 14 is an image view of a file system where an AVI file is allocated. Reference numeral 751 denotes a directory entry which describes a file name, an extension, and a cluster number of a cluster where the head of the file is allocated. Reference numeral 752 denotes a FAT that manages the use state of clusters. Reference numeral 753 denotes an image view of an AVI file allocated in a data area on the file system. The head of a file is allocated in a data area with cluster number 10, and a chain can be traced from the head cluster to the next cluster using the FAT 752. Reference numeral 754 denotes an index part which manages the types, offsets, and sizes of subchunks including audio and image data of the AVI file. In this part, these parameters are managed in the order starting from the first subchunk up to the last subchunk. Reference numeral 755 denotes a pointer to the current head subchunk. Reference numeral 756 denotes a pointer to the head subchunk after head part deletion is executed.

Figure 15:
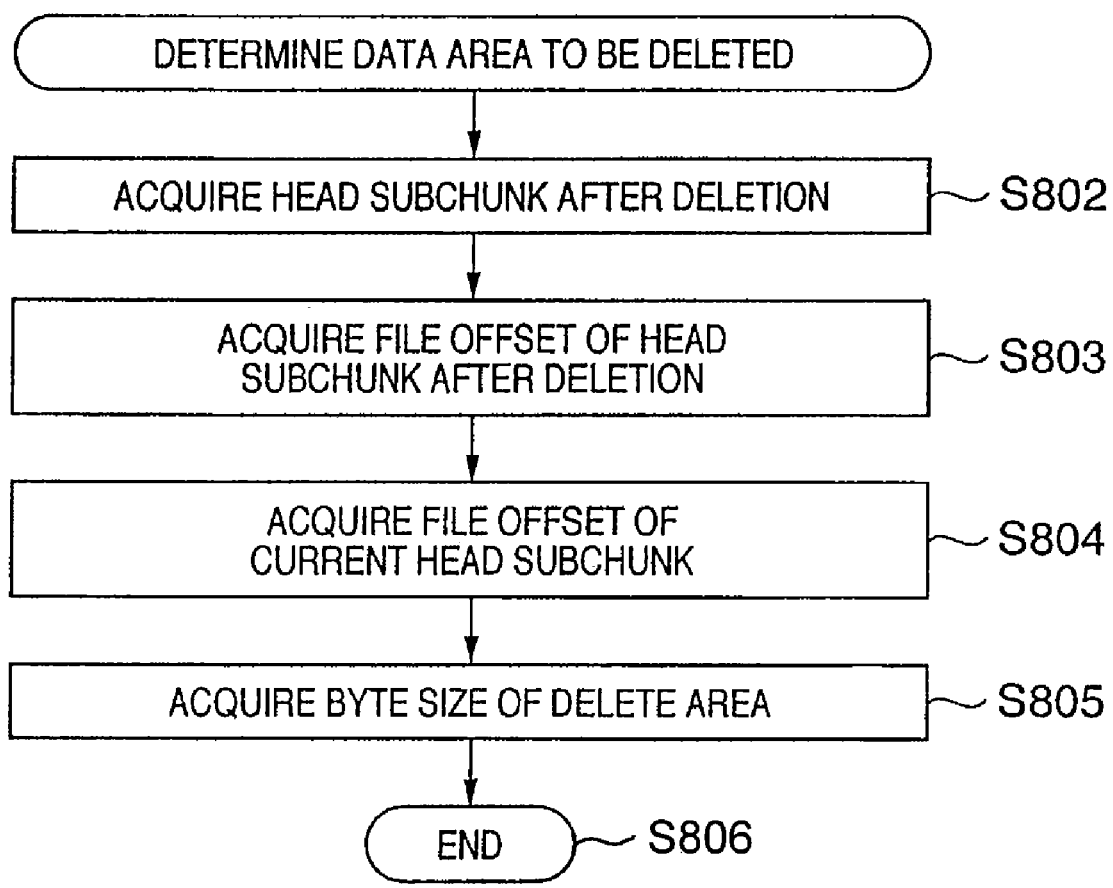
FIG. 15 is a flowchart showing a determination routine of a data area to be deleted.
Figure 16:
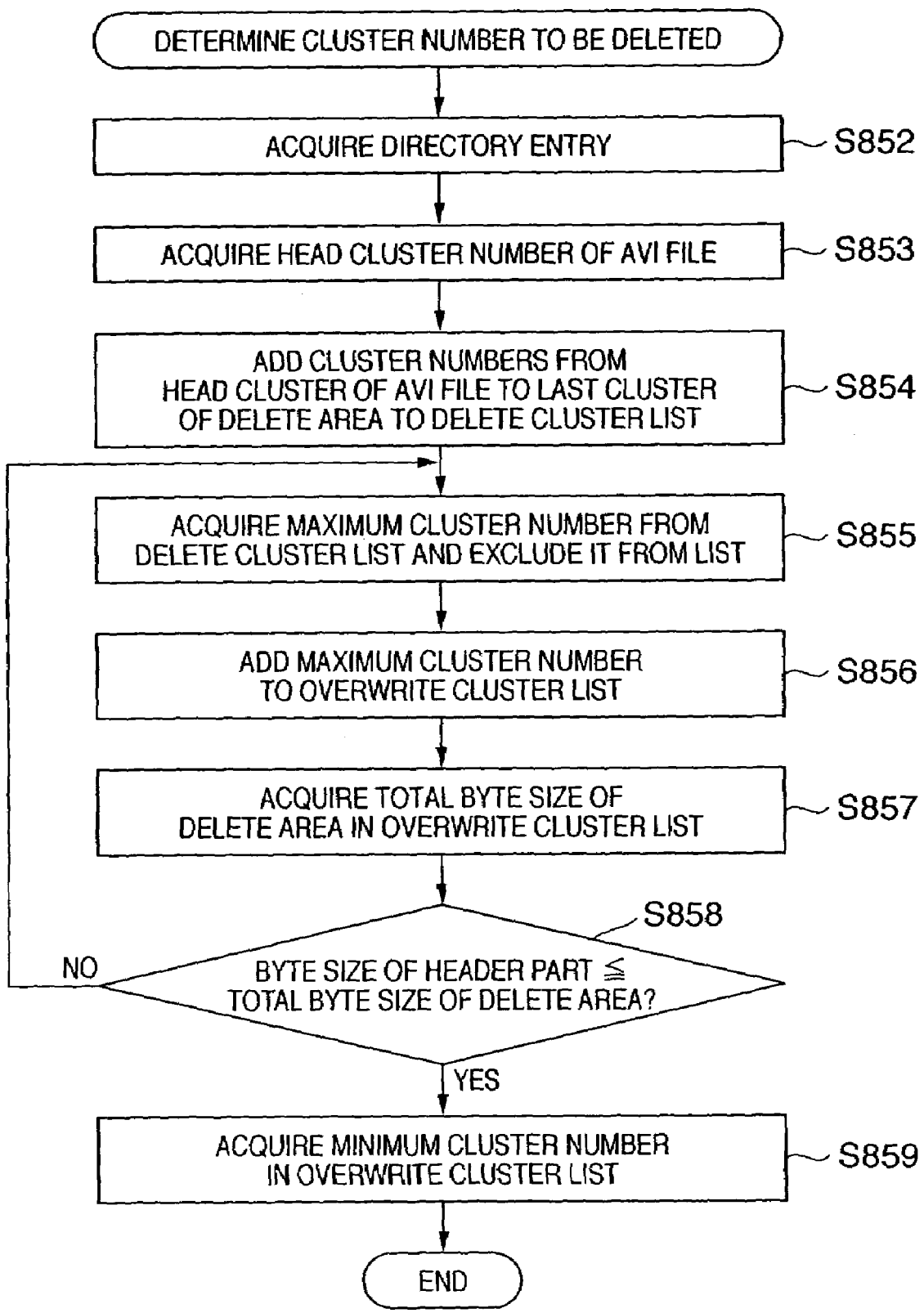
FIG. 16 is a flowchart showing a determination routine of a cluster number to be deleted.

FIG. 15 is a flowchart showing the determination routine of a data area to be deleted in step S602 in FIG. 11. When a partial delete area from the head of the AVI file is determined by operations on the UI window in FIG. 13, a head subchunk after deletion is acquired in step S802. In step S803, a file offset of the head subchunk after deletion is acquired from the index part. In step S804, a file offset of the current head subchunk is acquired from the index part. In step S805, the byte size of the delete area is acquired on the basis of the offset of the current subchunk and that of the subchunk after deletion. The flow then advances to step S806 to end this sequence. Although not shown, the acquired byte size of the delete area is used to be compared with the data size in the header. That is, the processing result of this flow is used to check if the header can be copied within the delete area. If the data size of the delete area is smaller than that of the header, since there is no space to move the header, the next process in FIG. 16 is skipped, and the flow advances to step S954 in FIG. 17. After the delete area is set as an invalid area, a JUNK area of the header is expanded by the invalid area.

FIG. 16 is a flowchart showing the determination routine of cluster numbers to be deleted. In step S852, the directory entry of the AVI file which is to undergo head part deletion is acquired from the file system. In step S853, the head cluster number of the AVI file is acquired from the directory entry. In step S854, cluster numbers from that of the head cluster of the AVI file to that of a cluster including the last data of the delete area are added to a delete cluster list. In step S855, a maximum cluster number is acquired from the delete cluster list, and is excluded from the delete cluster list. In step S856, the cluster number excluded from the delete cluster list is added to an overwrite cluster list. In step S857, the total byte size of the delete area of all clusters in the overwrite cluster list is acquired. In step S858, the byte size of the header part is compared with the total byte size of the delete area acquired in step S857. If the byte size of the header part is equal to or smaller than the total byte size of the delete area, the flow advances to step S859; otherwise, the flow returns to step S855. In this way, the processes in steps S855 to S858 are repeated until the byte size of the header part becomes equal to or smaller than the total byte size of the delete area. In step S859, a minimum cluster number in the overwrite cluster list is acquired, thus ending this sequence.

Figure 17:
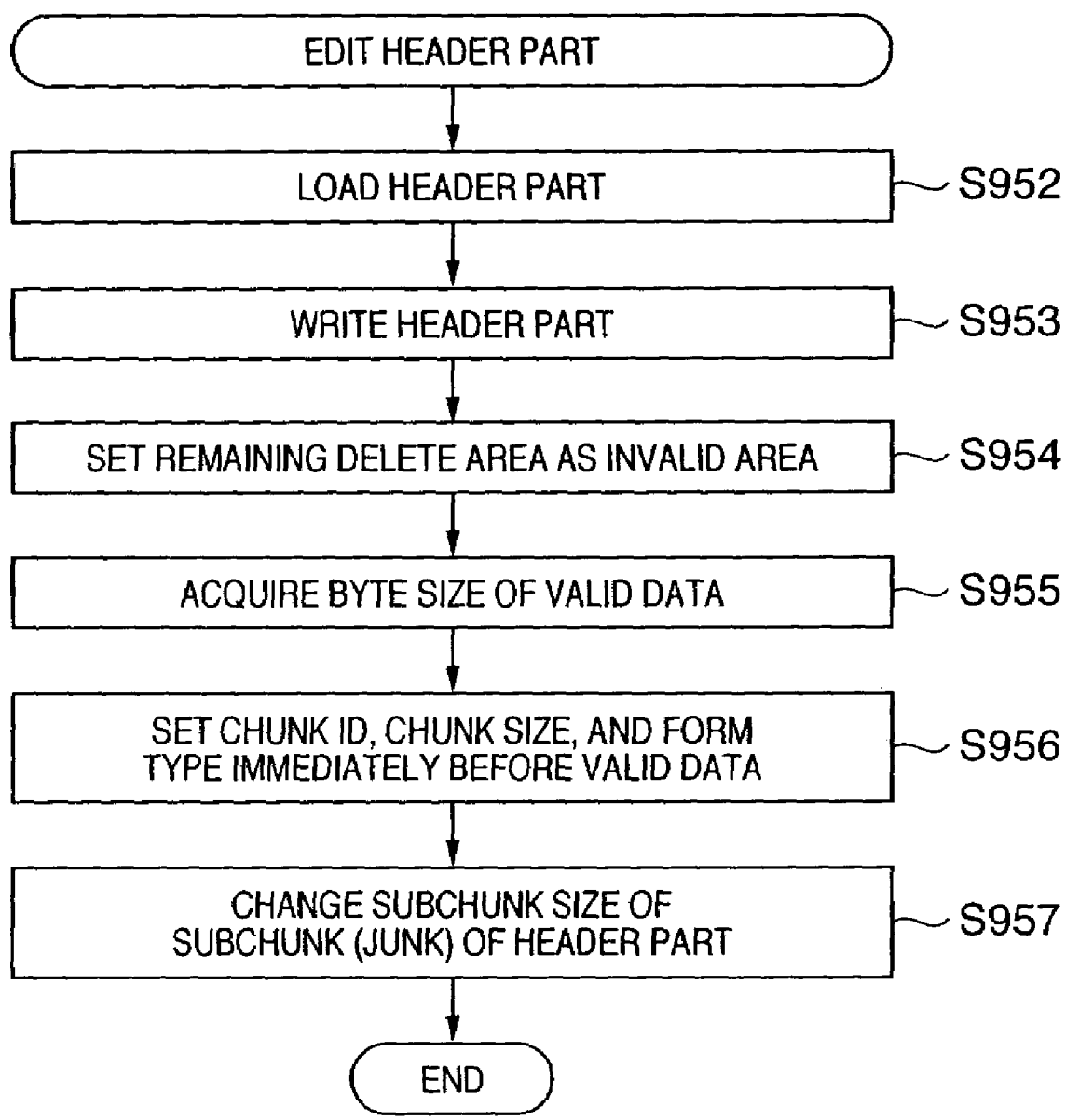
FIG. 17 is a flowchart showing an edit process of a header part.

FIG. 17 is a flowchart showing the edit process of the header part. In step S952, a process for loading the header part onto the memory area is executed. In step S953, the header part loaded in step S952 is written at the head of a cluster of the cluster number acquired in step S859 in FIG. 16. In step S954, a process for acquiring the size of the delete area, which remains immediately after the written header part, and overwriting invalid data on that delete area to set it as an invalid area, and acquiring the size of that area is executed. That is, a part from the header part of the AVI file to the head frame after deletion is changed to a padding area indicating insignificant data. In step S955, a process for acquiring the byte size of valid data is executed. In step S956, a process for setting a chunk ID 'LIST' and form type 'movi" immediately before the valid data, and setting the chunk size together with the byte size of the valid data acquired in step S955 is executed. In step S957, a process for changing the chunk size of the JUNK subchunk of the header part on the basis of the size of the invalid area is executed, thus ending this sequence.

Figure 18:
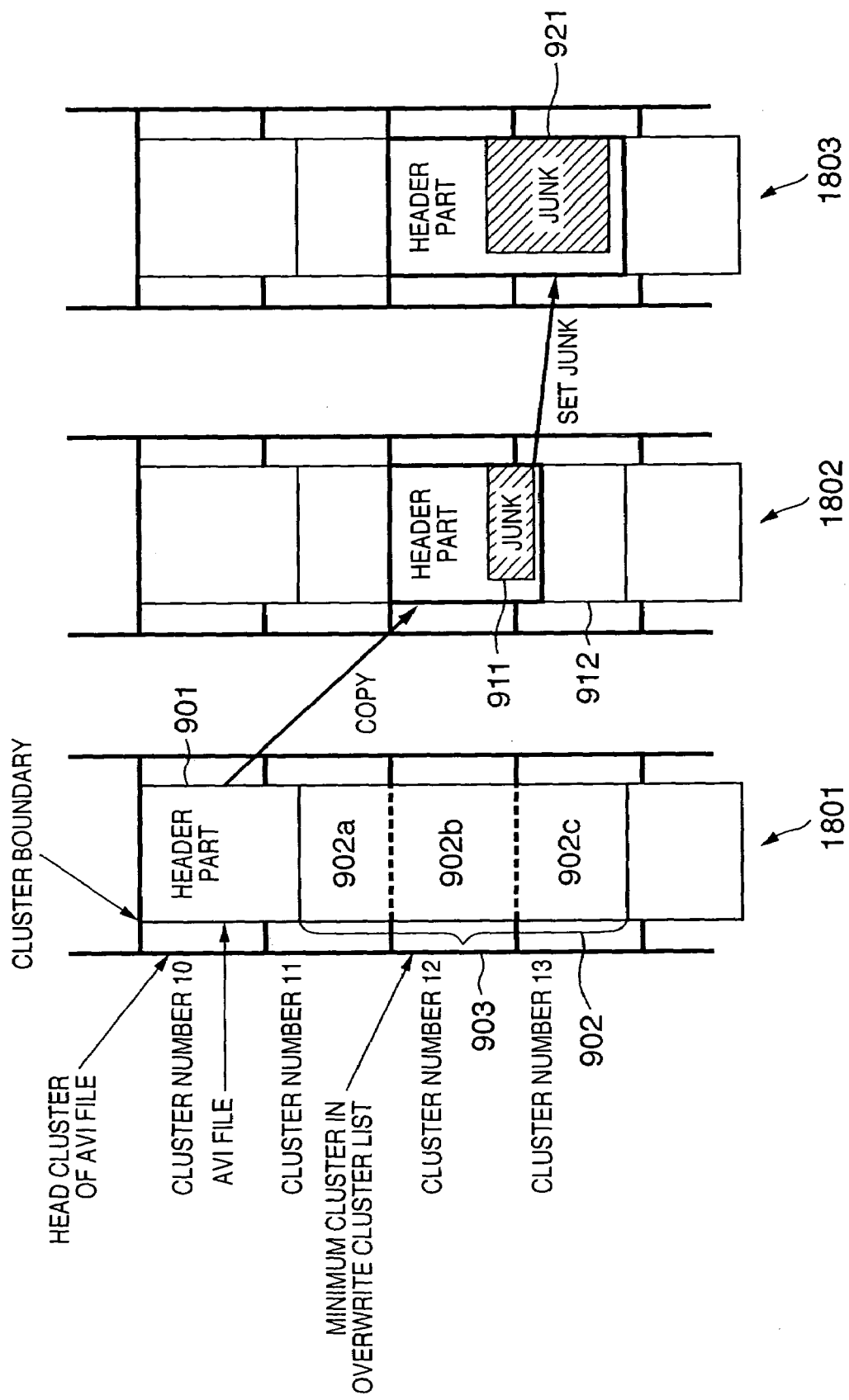
FIG. 18 is an image view showing processes of partial deletion.

FIG. 18 is an image view for plainly explaining the processes executed in the flowcharts of FIGS. 16 and 17. FIG. 18 illustrates transition of an AVI file when a given part at the head of the AVI file whose head part is allocated at cluster number 10 is to be deleted in correspondence with the AVI file that has been exemplified in FIG. 14. Reference numeral 1801 in FIG. 18 denotes an image view of an AVI file before the header part is copied. Reference numeral 901 denotes a header part before partial deletion, which is allocated at cluster number 10. Reference numeral 902 denotes a partial delete area determined by the user's operation. This delete area 902 can be divided into a delete area 902a allocated at cluster number 11, delete area 902b allocated at cluster number 12, and delete area 902c allocated at cluster number 13. Reference numeral 903 denotes a cluster of cluster number 12 which becomes the head of the AVI file after deletion. The header part 901 is to be copied to the cluster of cluster number 12.

When the process in step S853 in FIG. 16 is applied to the AVI file 1801, cluster number 10 is acquired as the head cluster number. With the process in step S854, cluster numbers 10 to 13 are added to the delete cluster list. Furthermore, "13" as the maximum cluster number is excluded from the delete cluster list with the process in step S855, and "13" is added to the overwrite cluster list with the process in step S856. The total byte size of the delete area of cluster number "13" written in the overwrite cluster list is acquired in step S857, and is compared with the byte size of the header part 901 in step S858. As can be seen from FIG. 18, in this example, since the data size of the header part 901 is larger than that of the delete area 902c in cluster number 13, the flow returns to step S855 in the process in FIG. 16. In step S855, "12" is acquired as the maximum cluster number from the delete cluster list, and is excluded from the list. After that, the flow advances to step S856 to add "12" to the overwrite cluster list. As a result, in step S857 the total byte size of 902b and 902c is acquired as the delete area in the overwrite cluster list. As can be seen from 1801 in FIG. 18, since this total byte size (902b+902c) is equal to or larger than the byte size of the header part 901, the flow advances from step S858 to step S859 to acquire "12" as the minimum cluster number in the overwrite cluster list. In step S952 in FIG. 17, data of the header part 901 is loaded. Furthermore, in step S953, the data of the header part 901 is written from the head of cluster number 12. As a result, the AVI file has a state 1802.

Reference numeral 1802 in FIG. 18 denotes an image view of the AVI file upon copying the header part 901. Reference numeral 911 denotes a copy of the header part 901 in 1801, which is written in the cluster 903 of cluster number 12. Reference numeral 912 denotes a delete area present after the header part is copied. The delete area 912 immediately after the header part is set as an invalid area in the AVI file 1802 to acquire its size in step S954, and the size of a JUNK area of the header part is changed to that of the invalid area in step S957, thus obtaining an AVI file 1803. Reference numeral 1803 denotes an image view of the AVI file upon re-setting the JUNK area of the header part. Reference numeral 921 denotes a subchunk in which the delete area 912 included in the AVI file 1802 is re-set as the JUNK area.

In this embodiment, upon moving the header part and changing the size, as shown in FIG. 18, at least one successive cluster group, which includes the last cluster and has a size larger than that of the header part, is specified from a plurality of clusters including delete area, and the header part is moved to the head of that cluster group. However, the present invention is not limited to this. For example, the number of clusters ("2" in FIG. 18) occupied by the header part may be acquired in advance, and the header part may be moved to a cluster number ("12" in FIG. 18) obtained by subtracting that number of clusters from a maximum cluster number ("13" in FIG. 18) including delete data and adding 1 to the difference. According to the process of this embodiment, since the JUNK area size of the header part is increasing, a process for minimizing the JUNK area size of the header part may be done before the process in FIG. 16. That is, upon moving the header, the JUNK area included in the current header may be deleted, and the free size of the last cluster of the delete area may then be compared with the data size of the header.

Figure 19:
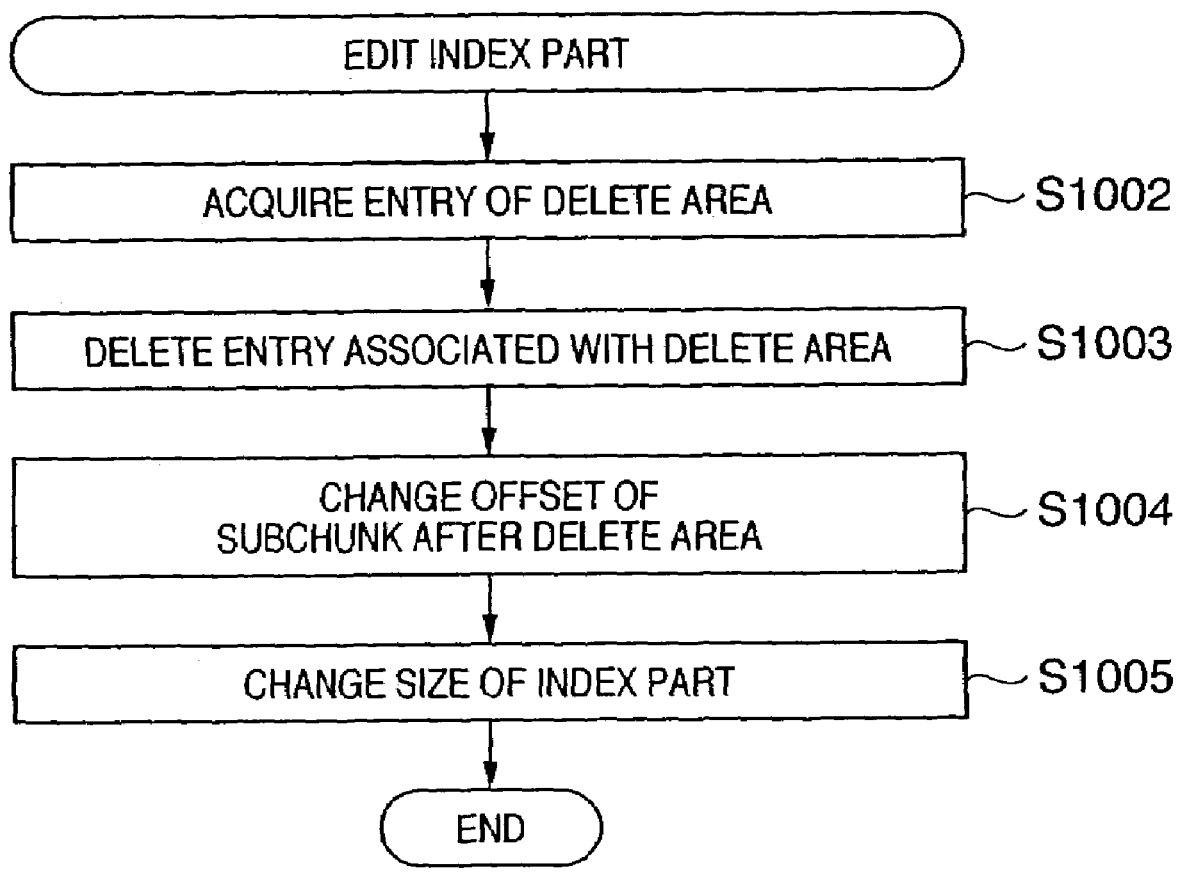
FIG. 19 is a flowchart showing an edit process of an index part.

FIG. 19 is a flowchart showing details of the edit process of the index part in step S606 in FIG. 11. In step S1002, entries having information associated with subchunks included in the delete area are acquired in step S1002. A process for deleting the entries acquired in step S1002 from the index part is executed in step S1003. In step S1004, a process for changing offset values in subchunk files in association with entries that follow the deleted entries is executed. In step S1005, a process for calculating and changing the size of the index part is executed, thus ending this sequence.

Figure 20:
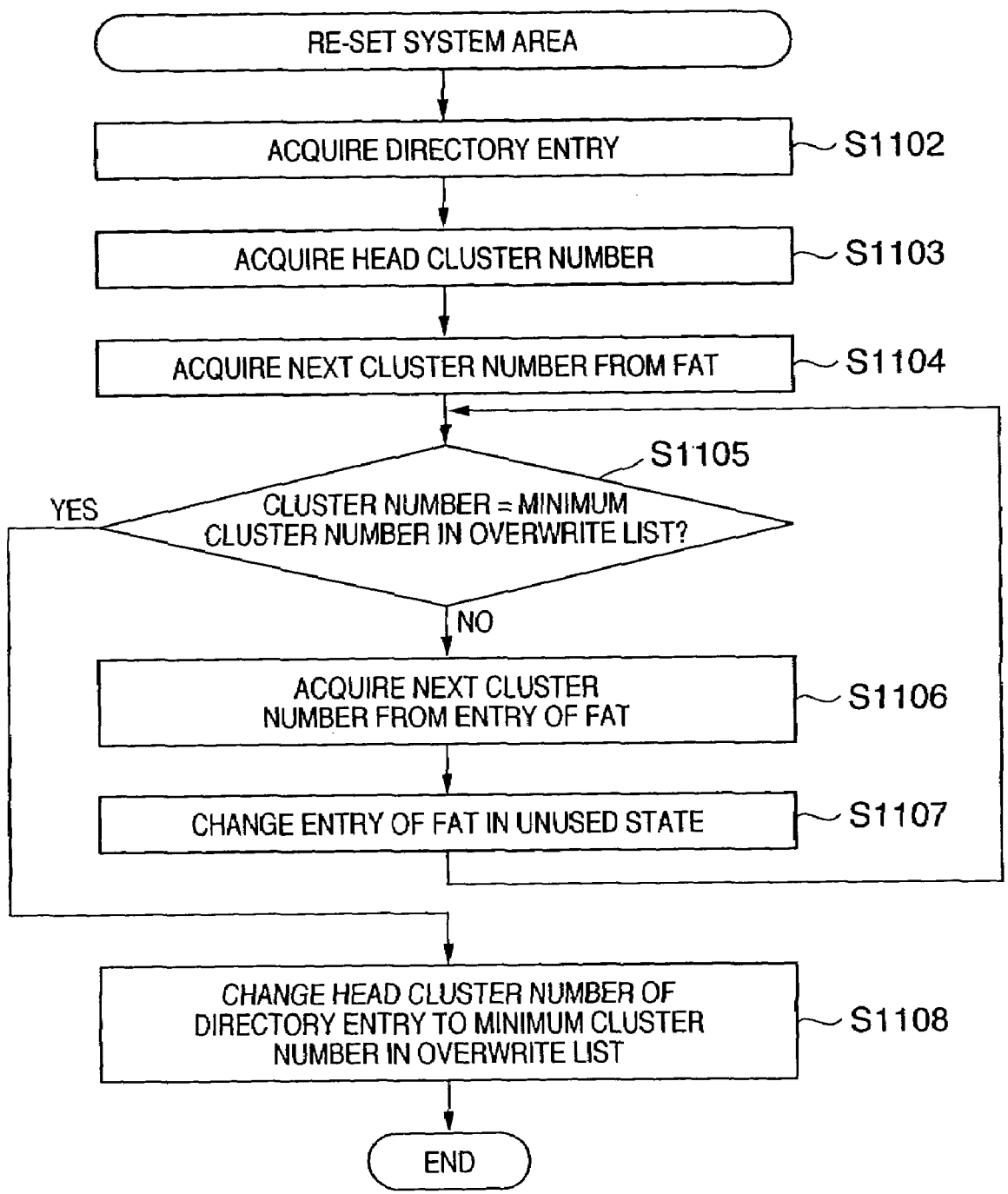
FIG. 20 is a flowchart showing a re-setting routine of a system area.

FIG. 20 is a flowchart showing details of the system area re-setting routine in step S607 in FIG. 11. In step S1102, a process for acquiring the directory entry of the AVI file which is to undergo head part deletion from the system file is executed. In step S1103, a process for acquiring the head cluster number of the AVI file from the directory entry is executed. In step S1104, a process for acquiring the next cluster number from the FAT entry of the cluster number acquired in step S1103 is executed. In step S1105, the cluster number is compared with the minimum cluster number in the overwrite cluster list acquired in FIG. 16. If the two cluster numbers are equal to each other, the flow jumps to step S1108. If the cluster numbers are not equal to each other, the flow advances to step S1106. In step S1106, a process for acquiring the next cluster number from the FAT entry is executed. In step S1107, a process for changing the FAT entry to an unused area is executed. Upon completion of step S1107, the flow returns to step S1105 to repeat steps S1105 to S1107 until the cluster number becomes equal to the minimum cluster number in the overwrite cluster list. In step S1108, a process for changing the head cluster number in the directory entry to the minimum cluster number in the overwrite cluster list is executed, thus ending this sequence.

Figure 21:
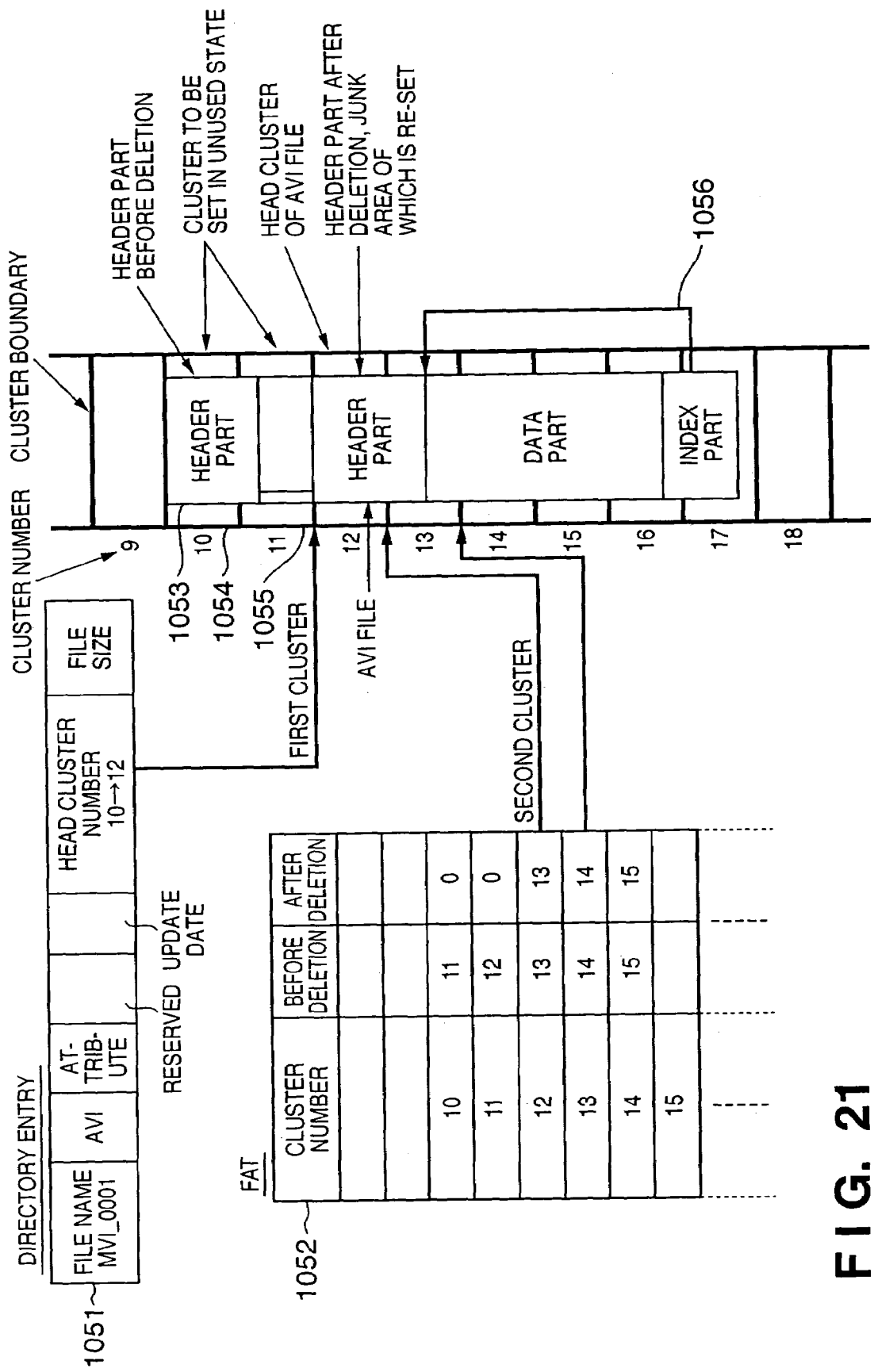
FIG. 21 is an image view of an AVI file upon copying a header part.

FIG. 21 is an image view of an AVI file after the header part move process in FIGS. 16 to 20 is applied to the AVI file shown in FIG. 14. Reference numeral 1051 denotes a directory entry that describes a file name, an extension, and a cluster number of a cluster including the head of a file. Since the header part has been moved from cluster numbers 10 to 12 by the delete process, the head cluster number must be changed to 12. Reference numeral 1052 denotes a FAT that manages the use state of clusters. Since the clusters of cluster numbers 10 and 11 form an invalid area, their FAT values are set to be zero (unused state) after deletion. Reference numeral 1053 denotes a header part before partial deletion. Reference numerals 1054 and 1055 denote clusters that describe only invalid data. Reference numeral 1056 denotes a file offset to the head subchunk after deletion.

With the above process, in case of partial deletion from the head frame, the header part of the AVI file is moved in place of changing a cluster chain in the AVI file, and the moved header part is newly changed to the head cluster of the AVI file. Hence, occurrence of discontinuous cluster chains in the AVI file can be prevented, and the time required for seek can be reduced. Also, since occurrence of fragmentation can be suppressed, the time required for free space seek later can also be reduced.

In this embodiment, the AVI file has been exemplified as a data file to explain the data delete process. However, the present invention is not limited to such specific file, and can be applied to files of other types. For example, the present invention can be similarly applied to an MPEG file and the like.

<Functional Arrangement>

FIG. 1 is a functional block diagram that extracts functions required for the data delete process based on the aforementioned description. Referring to FIG. 1, reference numeral 101 denotes a recording medium such as a nonvolatile memory, hard disk, or the like, which can record data for respective clusters. The recording medium 101 includes a data file 101*a* of audio and image data, and a management table 101*b* which indicates if each cluster is free or in use, and the next cluster if that cluster is in use.

Reference numeral 102 denotes a recording unit which reads out the contents of the data file 101*a* and management table 101*b* in the recording medium 101, and writes new data in them. The recording unit 102 must have functions corresponding to the type of recording medium 101. For example, if the recording medium 101 is a flash memory, the recording unit 101 includes a memory access circuit, a CPU for controlling that circuit, a program for making the CPU execute a read/write process, and the like. On the other hand, if the recording medium 101 is a hard disk, the recording unit 101 includes a hard disk drive, a CPU for controlling that drive, a program for making the CPU execute a read/write process, and the like.

Reference numeral 103 denotes a delete unit which receives a user's instruction, and deletes a part of a data file recorded in the recording unit.

Reference numeral 104 denotes an operation unit which is operated by the user to send a delete instruction to the delete unit, and allows the user to input a data area to be deleted from the head of the data file. For example, the operation unit includes cross-cursor keys, a touch panel, and the like provided to the digital still camera, and also a keyboard and mouse if the delete process is to be implemented by a computer.

Reference numeral 105 denotes a temporary storage unit which temporarily stores data read out from the recording medium 101, intermediate calculation results of the delete process, and the like, when the delete unit 103 executes the delete process. Normally, a RAM servers as the temporary storage unit 105.

The delete unit 103 includes a header move unit 103*a*, header size determination unit 103*b*, and management table rewrite unit 103*c*.

When the delete unit 103 receives a partial delete instruction from the head of a data file from the operation unit 104, the header move unit 103*a* moves the location of header information for respective clusters. More specifically, the header move unit 103*a* copies the header information of the data file to the head of an appropriate cluster in the delete area. The header size change unit 103*b* changes the size of the header information so that the trailing end of the moved header information is continuous to the head frame after deletion. In this manner, the head data after data deletion starts immediately after the moved header information. Finally, the management table rewrite unit 103*c* changes the cluster including the header information of the data file to the head cluster of the data file using the file system, and sets a data area from the head of the header information before movement to that of the moved header information in an unused state using the file system.

In this way, upon partially deleting a data file, a new head cluster of the data file is determined on the file system, and clusters that become unnecessary are set in an unused state on the management table, thus reducing the number of accesses to the file system, and implementing a high-speed edit process. Since the header part of the data file is moved to prevent discontinuous free clusters from being produced, a high-speed free space seek process later can be achieved.

That is, according to the present invention, data can be deleted at high speed, and discontinuous cluster chains can be prevented from being produced due to data deletion.

OTHER EMBODIMENTS

The embodiment of the present invention has been described. However, the apparatus according to the present invention is not limited to that which is incorporated in the digital still camera. For example, when the functions included in the present invention are implemented by executing a specific program using a computer, that computer is included in the technical scope of the present invention. Of course, a dedicated apparatus for implementing the functions included in the present invention is included in the technical scope of the present invention. The present invention may be applied to either a system made up of a plurality of devices, or an apparatus including a single device.

Note that the present invention includes a case wherein the invention is achieved by directly or remotely supplying a program of software that implements the functions of the aforementioned embodiments to a system or apparatus, and reading out and executing the supplied program code by a computer of that system or apparatus. In this case, software need not have the form of program as long as it has the program function.

Therefore, the program code itself installed in a computer to implement the functional process of the present invention using the computer implements the present invention. That is, the present invention includes the computer program itself for implementing the functional process of the present invention.

In this case, the form of program is not particularly limited, and an object code, a program to be executed by an interpreter, script data to be supplied to an OS, and the like may be used as along as they have the program function.

As a recording medium for supplying the program, for example, a floppy® disk, hard disk, optical disk, magnetooptical disk, MO, CD-ROM, CD-R, CD-RW, magnetic tape, nonvolatile memory card, ROM, DVD (DVD-ROM, DVD-R), and the like may be used.

As another program supply method, the program may be supplied by establishing connection to a home page on the Internet using a browser on a client computer, and downloading the computer program itself of the present invention or a compressed file containing an automatic installation function from the home page onto a recording medium such as a hard disk or the like. Also, the program code that forms the program of the present invention may be segmented into a plurality of files, which may be downloaded from different home pages. That is, the claims of the present invention include a WWW server which makes a plurality of users download a program file required to implement the functional process of the present invention by the computer.

Also, a storage medium such as a CD-ROM or the like, which stores the encrypted program of the present invention, may be delivered to the user, the user who has cleared a predetermined condition may be allowed to download key information that decrypts the program from a home page via the Internet, and the encrypted program may be executed using that key information to be installed on a computer, thus implementing the present invention.

The functions of the aforementioned embodiments may be implemented not only by executing the readout program code by the computer but also by some or all of actual processing operations executed by an OS or the like running on the computer on the basis of an instruction of that program.

Furthermore, the functions of the aforementioned embodiments may be implemented by some or all of actual processes executed by a CPU or the like arranged in a function extension board or a function extension unit, which is inserted in or connected to the computer, after the program read out from the recording medium is written in a memory of the extension board or unit.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-020382 filed on Jan. 28, 2004, which is hereby incorporated by reference herein.

What is claimed is:

1. A data processing apparatus comprising:
   recording means for recording a moving image data file including moving image data and header information related to the moving image data in a plurality of clusters on a recording medium, the moving image data being recorded on a cluster immediately after a cluster in which the header information is recorded;
   data deletion means for deleting a part of the moving image data included in the moving image data file from a head of the moving image data, recorded on the recording medium in response to a delete instruction; and
   control means for controlling the recording means to move the header information of the moving image data file including the deleted part of the moving image data to a cluster in which the deleted part of the moving image data has been recorded, without moving the remaining part of the moving image data which is included in the moving image data file and is other than the deleted part of the moving image data, so that the cluster in which the header information is recorded is immediately before the cluster in which the remaining part of the moving image data is recorded,
   wherein said recording means records the moving image data file using a management table representing whether or not each of the plurality of clusters on the recording medium is in an unrecorded state, and
   said control means (I) updates the management table to make clusters in the unrecorded state, the clusters including a cluster in which the header information has been recorded before moving in response to the delete instruction and a cluster in which the deleted part of the moving image data has been recorded and the moved header information is not recorded, and (ii) controls said recording means to move the header information to one or more continuous clusters including a last cluster of a plurality of clusters in which the deleted part of moving image data has been recorded, and being larger than a size of the header information.

2. The apparatus according to claim 1, wherein said control means increases a size of the header information by a size of an area between the end position of the moved header information and the head position of the remaining part of the moving image data.

3. A data processing method comprising:
   a recording step of recording a moving image data file including moving image data and header information related to the moving image data in a plurality of clusters on a recording medium, the moving image data being recorded on a cluster immediately after a cluster in which the header information is recorded;
   a data deletion step of deleting a part of the moving image data included in the moving image data from a head of moving image data recorded on the recording medium in response to a delete instruction; and
   a controlling step of controlling recording means to move the header information of the moving image data file including the deleted part of the moving image data to a cluster in which the deleted part of the moving image data has been recorded, without moving the remaining part of the moving image data which is included in the moving image data file and is other than the deleted part of the moving image data, so that the cluster in which the header information is recorded is immediately before the cluster in which the remaining part of the moving image data is recorded,
   wherein the moving image data file is recorded in said recording step using a management table representing whether or not each of the plurality of clusters on the recording medium is in an unrecorded state, and
   in said control step, (I) the management table is updated to make clusters in the unrecorded state, the clusters including a cluster in which the header information has been recorded before moving in response to the delete instruction and a cluster in which the deleted part of the moving image data has been recorded and the moved header information is not recorded, and (ii) the recording means is controlled to move the header information to one or more continuous clusters including a last cluster of a plurality of clusters in which the deleted part of moving image data has been recorded, and being larger than a size of the header information.

4. A data processing program for making a processor execute:
   a recording step of recording a moving image data file including moving image data and header information related to the moving image data in a plurality of clusters on a recording medium, the moving image data being recorded on a cluster immediately after a cluster in which the header information is recorded;
   a data deletion step of deleting a part of the moving image data included in the moving image data from a head of moving image data recorded on the recording medium in response to a delete instruction; and
   a controlling step of controlling recording means to move the header information of the moving image data file including the deleted part of the moving image data to a cluster in which the deleted part of the moving image data has been recorded, without moving the remaining part of the moving image data which is included in the moving image data file and is other than the deleted part of the moving image data, so that the cluster in which the header information is recorded is immediately before the cluster in which the remaining part of the moving image data is recorded,
   wherein the moving image data file is recorded in said recording step using a management table representing whether or not each of the plurality of clusters on the recording medium is in an unrecorded state, and
   in said control step, (I) the management table to make clusters in the unrecorded state, the clusters including a cluster in which the header information has been recorded before moving in response to the delete instruction and a cluster in which the deleted part of the moving image data has been recorded and the moved header information is not recorded, and (ii) the recording means is controlled to move the header information to one or more continuous clusters including a last cluster of a plurality of clusters in which the deleted part of moving image data has been recorded, and being larger than a size of the header information.

5. The apparatus according to claim 1, further comprising an imaging unit which generates the moving image data.

6. The apparatus according to claim 1, further comprising an operation unit which issues the delete instruction.

7. The apparatus according to claim 1, wherein the recording medium comprises a memory card.

8. The apparatus according to claim 1, wherein said recording means records the moving image data file including the moving image data, the header information, and audio data onto the recording medium.

9. The method according to claim 3, further comprising an imaging step of generating the moving image data.

10. The method according to claim 3, further comprising an operation step of issuing the delete instruction.

11. The method according to claim 3, wherein the recording medium comprises a memory card.

12. The method according to claim 3, wherein said recording means records the moving image data file including the moving image data, the header information, and audio data onto the recording medium.

13. The program according to claim 4, further comprising making a processor execute an imaging step of generating the moving image data.

14. The program according to claim 4, further comprising making a processor execute an operation step of issuing the delete instruction.

15. The program according to claim 4, wherein the recording medium comprises a memory card.

16. The program according to claim 4, wherein the recording means records the moving image data file including the moving image data, the header information, and audio data onto the recording medium.

* * * * *